United States Patent [19]

Harris et al.

[11] Patent Number: 5,773,377
[45] Date of Patent: *Jun. 30, 1998

[54] LOW TEMPERATURE SINTERED, RESISTIVE ALUMINUM NITRIDE CERAMICS

[75] Inventors: Jonathan H. Harris, Scottsdale; Robert A. Youngman, Paradise Valley, both of Ariz.; Subhash L. Shinde, Cortland Manor, N.Y.; Lester W. Herron, Hopewell Junction, N.Y.; Benjamin V. Fasano, New Windsor, N.Y.

[73] Assignees: Crystalline Materials Corporation, Phoenix, Ariz.; International Business Machines Corporation, Armonk, N.Y.

[ * ] Notice: The term of this patent shall not extend beyond the expiration date of Pat. No. 5,541,145.

[21] Appl. No.: 489,610

[22] Filed: Jun. 12, 1995

Related U.S. Application Data

[63] Continuation-in-part of Ser. No. 173,906, Dec. 22, 1993, abandoned.

[51] Int. Cl.[6] .................... C04B 35/582; C04B 35/581
[52] U.S. Cl. .................. 501/98.4; 501/98.5; 501/98.6; 501/152; 501/153; 264/56; 428/698; 428/704; 428/901
[58] Field of Search .............................. 501/96, 98, 153, 501/152, 98.4, 98.5, 98.6; 428/698, 704, 901; 264/56

[56] References Cited

U.S. PATENT DOCUMENTS

| | | | |
|---|---|---|---|
| 4,540,673 | 9/1985 | Takeda et al. | 501/96 |
| 4,569,922 | 2/1986 | Suzuki | 501/89 |
| 4,591,537 | 5/1986 | Aldinger et al. | 428/698 |
| 4,615,863 | 10/1986 | Inoue et al. | 419/23 |
| 4,618,592 | 10/1986 | Kuramoto et al. | 501/96 |
| 4,627,815 | 12/1986 | Aldinger et al. | 432/24 |
| 4,642,298 | 2/1987 | Kuramoto et al. | 501/96 |
| 4,659,611 | 4/1987 | Iwase et al. | 428/209 |
| 4,766,097 | 8/1988 | Shinozaki et al. | 501/98 |
| 4,786,448 | 11/1988 | Fukuhara et al. | 264/65 |
| 4,877,760 | 10/1989 | Okuno et al. | 501/98 |
| 4,883,780 | 11/1989 | Kasori et al. | 501/96 |
| 4,950,435 | 8/1990 | Taniguchi et al. | 264/65 |
| 4,960,734 | 10/1990 | Kanai et al. | 501/98 |
| 5,063,183 | 11/1991 | Taniguchi et al. | 501/96 |
| 5,077,245 | 12/1991 | Miyahara | 501/96 |
| 5,147,832 | 9/1992 | Shimoda et al. | 501/96 |
| 5,154,863 | 10/1992 | Miyahara | 264/65 |
| 5,165,983 | 11/1992 | Sugiura et al. | 428/141 |
| 5,541,145 | 7/1996 | Harris et al. | 501/96 |

OTHER PUBLICATIONS

Udalov et al, *the Al2O3–CaO–Y2O3 System*, Russian Journal of Inorganic Chemistry, 1979, p. 1549 (no month).

Kurokawa, et al, *Development and Microstructrual Characterization of High–Thermal Conductivity Aluminum Nitride Ceramics*, Journal American Ceramic Society, 1988, pp. 588–594 (no month).

(List continued on next page.)

*Primary Examiner*—Michael Marcheschi
*Attorney, Agent, or Firm*—Renner Kenner Greive Bobak Taylor & Weber

[57] ABSTRACT

An aluminum nitride ceramic having enhanced properties suitable for electronic packaging applications can be prepared from a synergistic aluminum nitride powder/sintering aid mixture, in which the sintering aid is formulated to provide a resultant desirable second phase within the sintered body. The aluminum nitride powder/sintering aid mixture can be formed into green sheet-metal laminates and sintered at low temperature to yield high density, high electrical resistivity, and high thermal conductivity metal ceramic sintered bodies with low camber.

50 Claims, 14 Drawing Sheets

OTHER PUBLICATIONS

Trocynski et al, *Effect of Additives on the Pressureless Sintering of Aluminum Nitride between 1500° and 1800° C.*, Journal of American Ceramic Society (1989) pp. 1488–1491 (no month).

Yesaf et al, Development of Aluminum Nitride Ceramics by Pressureless Sintering, pp. 1–11 Bernard Schwartz, *Multilayer Ceramics,* Materials Research Symposium Proc., vol. 40, (1985 Materials Research Society) pp. 49–59 (no month).

Cannell et al, *Processing of Electronic Ceramics,* Advanced Ceramic Processing and Technology, pp. 95–121 (date unknown).

Sainz DeBaranda, P., Phd. "The effect of Calcia and Silica on the Thermal Conductivity of Aluminum Nitride Ceramics" Dissertation, Rutgers, The State Univ. of N.J. (1991) (no month).

Virkar, Anil V. et al, "Thermodynamic and Kenetic Affects of Oxygen Removal on the Thermal Conductivity of Aluminum Nitride", *J. Am. Ceram. Soc.,* vol. 72 No. 11, pp. 2031–2042 (1989) (no month).

Jang, Se–Aug et al "Effects of Dopants on the Complex Impedance and Dielectric Properties of Aluminum Nitride" *J. Am. Ceram. Soc.,* vol. 75, No. 11, pp. 3145–3148 (date unknown).

ø < 20°

ø > 80°

LOW TEMPERATURE SINTERED, RESISTIVE ALUMINUM NITRIDE CERAMICS

CROSS-REFERENCES TO RELATED APPLICATIONS

This application is a continuation-in-part of U.S. Ser. No. 08/173,906, filed Dec. 22, 1993 now abandoned.

FIELD OF THE INVENTION

The present invention is directed to ceramic bodies having electronic characteristics suitable for use as substrates for electronic packaging applications. More particularly, the invention is directed to sintered aluminum nitride bodies having a quaternary or pseudo-quaternary second phase and having a high electrical resistivity, while exhibiting high density and high thermal conductivity, and which are suitable for use as electronic substrates. These sintered aluminum nitride substrates are particularly suitable for use in multilayer metal-ceramic based microelectronic packages.

BACKGROUND

As compared to alumina and beryllia, the commercially predominant electronic ceramics, aluminum nitride ceramics potentially possess superior characteristics for electronic packaging applications with respect to electrical insulation, high thermal conductivity (above 120 W/m-K), thermal expansion match to silicon devices, low toxicity and low dielectric constant. Aluminum nitride substrates are potentially useful where high heat dissipation is required in a microelectronic package, such as in a multilayer metal-ceramic package for high power devices. Aluminum nitride ceramics for microelectronic applications must therefore be capable of accommodating metallized components, polymeric layers and heat generating, high power electronic devices.

Prepared from aluminum nitride powders, in order to achieve suitable properties the ceramic must achieve a certain density, at least about 90%, preferably greater than or equal to about 95%, of theoretical. Aluminum nitride decomposes below the temperature required to sinter it to maximum density. However, densification can be achieved at lower temperatures by the use of sintering aids.

Sintering aids liquify at temperatures below the decomposition and pure compound sintering temperatures for the ceramic, and promote densification of the ceramic grains by i) a particle rearrangement process mediated by capillary forces between the wetting liquid and the solid particles, and thereafter, ii) a solution-reprecipitation process. In this process, solid is preferentially dissolved at regions of high curvature (small particles) and redeposited at regions of low curvature (large particles). In addition, solid is preferentially dissolved at regions of solid-solid contact and redeposited away from the contact areas. At the later stages of the liquid sintering cycle, microstructure is refined via grain growth and coalescence processes.

Different combinations of sintering aids provide various compounds in situ which melt at different temperatures. The temperatures at which sintering occurs has an effect on the progress of the different types of sintering processes, and thus the microstructure and the final properties of the sintered ceramic body. Sintering aids also function to increase thermal conductivity of the sintered aluminum nitride body by gettering oxygen from the aluminum nitride powder. Thus, an effective sintering additive must form a liquid at low temperature capable of dissolving and reprecipitating aluminum nitride without depositing significant amounts of oxygen in the densifying ceramic. Not every liquid at sintering temperature will be able to getter oxygen and densify the ceramic.

All commercially available aluminum nitride powders contain oxygen as an impurity. This oxygen primarily takes two forms in the powder, as a native alumina coating on each of the powder particles, and as dissolved oxygen impurity within the crystalline lattice of the aluminum nitride particles. A minor amount will be tied up as an oxide of any metal impurities which may be present. At a given sintering temperature, only a certain amount of oxygen, primarily from native alumina and secondarily from other sources, will be available for reaction (hereinafter "available oxygen").

Upon densification the volume of the green body, and for multilayer structures the volume of the metal lamina contained in the green body, together with the linear dimensions of the body, decrease as a function of both the temperature experienced and the particular materials involved. If the metal and ceramic shrink at different times and rates, this shrinkage mismatch leads to residual stresses between the different constituent materials in the sintered body and distorts the final shape of the body. In order to maintain the exacting geometric tolerances required by the electronic packaging industry for multilayer ceramic based packages, it is necessary that the ceramic and the metal sinter at approximately the same onset temperature and rate.

Thus it is desirable to facilitate efficient sintering of aluminum nitride at particularly low temperatures to mediate the problems associated with different sintering rates and thermal expansion mismatches between the ceramic and metal portions of a multilayer electronic package.

The use of lower sintering temperatures by the art, however, has generally resulted in properties degrading from the desired theoretical levels. For instance, the electrical resistivities of some aluminum nitride sintered bodies, particularly those AlN substrates sintered with calcia and yttria containing sintering aids as discussed below, have been found to be unacceptably low (on the order of $10^8$ Ω-cm) for certain electronic packaging applications, and therefore, the substrates are not believed suitable for use as insulating substrates for electronic packaging applications.

At least some of these less than desirable properties may result from the failure of the sintering aids to either form an effective sintering liquid needed to densify the ceramic or to remove dissolved oxygen from the AlN lattice, and/or from the formation of an additional phase or additional phases within the AlN structure which comprise reaction products of the sintering aid(s), aluminum and oxygen.

Sintering aids for AlN which have been disclosed in the art include Group IIa, Group IIIa, and/or rare earth compounds, including calcia and yttria, among others. Resulting AlN sintered bodies are disclosed to contain alkaline earth-aluminates, Group IIIa-aluminates, rare earth-aluminates, and/or AlON.

U.S. Pat. No. 4,618,592 discloses the use of sintering aids for aluminum nitride which are at least one metal element selected from alkaline earth metals, lanthanum group metals and yttrium or a compound thereof. This patent, however, reports that in conventional aluminum nitride sintered bodies, there are found diffraction lines assigned to calcia, alumina, calcium aluminate and yttrium aluminate, but in the practice of its disclosed invention, such diffraction lines are not substantially shown.

It has been reported, for example in U.S. Pat. Nos. 4,746,637 and 5,077,245, that rare earth/alkaline earth compounds or rare earth/alkaline earth-aluminates have not been identified in the sintered body. Mixed oxides of Group IIa/IIIa metals and alumina have now been identified in aluminum nitride sintered with Group IIa/IIIa sintering aids. In Sainz De Baranda, Pedro, "The Effect of Calcia and Silica on the Thermal Conductivity of Aluminum Nitride Ceramics", A doctoral dissertation, Rutgers University, (Vol. 52/07-B of Dissertation Abstracts International, p 3846.), two ternary oxide compounds were identified in aluminum nitride bodies sintered at high temperatures using yttria and calcia (calcium nitrate) sintering aids, namely $CaYAlO_4$ and $CaYAl_3O_7$.

An investigation of the alumina, calcia, yttria ternary oxide phase system was reported in Udalov, et al., "The $Al_2O_3$-$CaO$-$Y_2O_3$ System", Russian Journal of Inorganic Chemistry, 24 (10) p 1549 (1979). Identified therein are the two above ternary metal oxide compounds of Ca, Y, Al and O (actually quaternary compounds) and several binary metal oxides of two of the three stated metals, and their relative location in a ternary phase diagram of the metal oxides as well as melting points and liquidus curves for possible compositions. This ternary phase diagram, representative also of possible second phase compositions in a sintered aluminum nitride body produced using yttrium and calcium based sintering aids, is substantially represented herein as FIG. 4.

Referring to the phase diagram of FIG. 4, the sintered aluminum nitride bodies prepared according to the disclosures of above identified U.S. Pat. Nos. 4,618,592, 4,746,637 and 5,077,245, lacking the binary and/or ternary oxides derived from alumina and the sintering aids, and/or exemplified by sintering at high temperatures, would exhibit a second phase having the composition represented by the triangular area VIII of the ternary phase diagram bounded by the lines $Al_2O_3$-B-H-$Al_2O_3$, that is, the corner farthest from the line $CaO$-$Y_2O_3$. High temperature or open atmosphere sintering would drive off CaO and other volatile species needed for the formation of the binary and ternary oxides present in other areas of the phase diagram, as is confirmed by their reported absence in these patents.

Further, the absence of these species is explained by second phase evolution phenomena recognized within the art. For a second phase composition within triangular area VIII of FIG. 4, the expected phase evolution trajectory would involve evolution primarily of calcia and alumina to move the second phase towards the $Al_2O_3$-$Y_2O_3$ phase boundary line, in a trajectory roughly parallel to line B-H until the boundary line was reached. Thereafter, $Al_2O_3$ would be preferentially evolved to result in a trajectory along the $Al_2O_3$-$Y_2O_3$ phase boundary line, moving progressively to the highly reduced yttria ($Y_2O_3$) composition.

Sainz de Baranda teaches that the 5:3 binary oxide yttrium aluminum garnet (YAG) disappears from the second phase when calcium, calculated as calcia, is used as a sintering aid in an amount greater than about 0.25 weight % (FIG. 73 of that document), and that increasing additions of "calcia" move the second phase compositions first into the triangular area II of the phase diagram bounded by lines C-A-D-C and then the triangular area III bounded by lines D-A-E-D. It was acknowledged by Sainz de Baranda that the second phases resulting from the use of sintering aids, which sintering aids are needed for densification and oxygen gettering, can result in the degradation of the characteristics desired for use in electronic packaging applications, particularly thermal conductivity. Sainz de Branda did not recognize that aluminum nitride could be sintered at low temperature to achieve high density coincident with high thermal conductivity by control of the second phase composition. Sainz de Baranda also observed that with the addition of calcia as a sintering aid, the second phase became more wetting of the grain boundaries, and low dihedral angles were observed (Pages 193 and 199–200).

Despite the potential benefits that can be achieved when using aluminum nitride substrates for electronic packaging in place of conventional materials, aluminum nitride substrates are currently used only in specialized applications and have not yet gained wide acceptance. We have now found that particular second phase compositions retained in the sintered aluminum nitride ceramic body following sintering, while effective in providing density to the aluminum nitride during the sintering process and enhanced thermal conductivity in the sintered body, contribute to the degradation of other necessary characteristics in the electronic packaging substrate, particularly electrical resistivity.

We have found that in sintered aluminum nitride bodies, the presence of residual calcium-aluminate (calcia) containing species is associated with very low resistivity. In fact, when certain calcium aluminate species are exposed during sintering to the environment of a refractory metal furnace, the second phase becomes conductive. This is a deleterious characteristic for an electronic packaging substrate, which must be insulating in order to isolate conductive paths for carrying signals and power to and from semiconductor chips.

Although sintering for longer times and/or at higher temperatures can volatilize or decompose calcia-based species from monolithic ceramics, this tends to degrade other desirable characteristics, as noted above. Also, for co-fired, heavily metallized multilayer ceramic packages, this technique is not effective. In the metal-ceramic laminates, dense metal planes sinter very early during the sintering process, and trap volatile species in the ceramic layers between them. Extended or higher temperature sintering are not able to remove these species from the ceramic. Second phase compositions which remain trapped in the ceramic layers between the dense metal layers in co-fired multilayer substrates exhibit very low resistivity and result in sintered body microstructures which are unsuitable for electronic packaging applications. In addition, it is readily apparent that such a co-fired, heavily metallized, multilayer package may have different second phase compositions which are dependent upon position in the package, (i.e., those areas between dense metal layers may have a different second phase composition than those in less densely metallized areas).

It would be useful, therefore, to be able to utilize sintering aids for their needed functions of densification and oxygen gettering or removal, while being able to control the second phase remaining in the sintered body compositionally and microstructurally, to provide enhanced characteristics, such as thermal conductivity and substrate resistivity, for electronic packaging applications.

SUMMARY OF THE INVENTION

It is therefore an object of the present invention to provide sintered aluminum nitride bodies suitable for use in electronic packaging which achieve high, near-theoretical density and high thermal conductivity at low sintering temperature.

It is another object of the present invention to provide sintered multilayer metal-ceramic bodies which exhibit minimal residual stress between their aluminum nitride and metal portions and minimal shape distortion.

It is a further object of the present invention to provide sintered aluminum nitride bodies which contain second phase components which result in the achievement of near-theoretical density and the maintenance of high thermal conductivity.

It is still a further object of the present invention to provide sintered aluminum nitride ceramic bodies containing second phase components, in the form of monolithic ceramic substrates or multilayer metal-ceramic laminates, for use in electronic packaging, in which the ceramic exhibits high electrical resistivity.

An aluminum nitride ceramic having enhanced properties suitable for electronic packaging applications can be prepared from a synergistic aluminum nitride powder/sintering aid mixture, in which the sintering aid is formulated to provide a resultant desirable second phase within the sintered body. The aluminum nitride ceramic body containing a second phase, which has been processed with a sintering—dewetting treatment cycle according to the present invention, exhibits a microstructure which provides the sintered body with a high resistivity.

The sintering aid comprises at least one metal oxide component from Group IIa, preferably calcia, and at least one metal oxide component from Group IIIa or the lanthanide oxides, preferably yttria, reactible with the native surface alumina and other available oxygen from the AlN grains. Components of the sintering aid package may also be reactible with residual carbon from binder burnout.

A resistive, sintered aluminum nitride ceramic body having a density of at least about 90% of theoretical, and a thermal conductivity of at least about 100 W/m-K, wherein said body has a microstructure containing aluminum nitride grains and a second phase having calcium containing components, said calcium containing components of said second phase being in contact with the aluminum nitride grains at a dihedral angle sufficient to provide a resistivity of at least about $10^8$ $\Omega$-cm and comprising at least one composition defined by the region including and within lines D-E-F-H-B in FIG. 4 but excluding line B-D.

A resistive, sintered aluminum nitride ceramic body having a density of at least about 90% of theoretical, and a thermal conductivity of at least about 100 W/m-K, wherein said body has a microstructure containing aluminum nitride grains and a second phase having calcium-containing components, said calcium containing components of said second phase being in contact with the aluminum nitride grains at a dihedral angle sufficient to provide a resistivity of at least about $10^8$ $\Omega$-cm and comprising at least one composition defined by the region including and within lines B-A-$C_1$ in FIG. 4 but excluding B.

A resistive, sintered aluminum nitride ceramic body having a density of at least about 90% of theoretical, and a thermal conductivity of at least about 100 W/m-K, wherein said body has a microstructure containing aluminum nitride grains and a second phase, said second phase comprising at least one of CaYAl$_3$O$_7$ and CaYAlO$_4$ components and at least one yttrium aluminate, said CaYAl$_3$O$_7$ or CaYAlO$_4$ components being in contact with the aluminum nitride grains at a dihedral angle sufficient to provide a resistivity of at least about $10^8$ $\Omega$-cm.

A process for preparing a resistive, sintered aluminum nitride ceramic body comprising:

a) sintering, at a sintering temperature between 1550° C. and 1800° C., a mixture of aluminum nitride powder with a sintering aid package sufficient to form a sintered body having a second phase with at least one calcium containing component, at least one second phase composition defined by the region including and within lines D-E-F-H-B in FIG. 4;

b) cooling said sintered body to at least below 1500° C.; and c) heat treating said sintered body at a temperature of at least 1300° C. but below the sintering temperature for a period of time sufficient to cause said calcium containing components of said second phase to at least partially dewet from the aluminum nitride so as to contact the aluminum nitride at a dihedral angle sufficient to provide a resistivity of at least about $10^8$ $\Omega$-cm.

A process for preparing a resistive, sintered aluminum nitride ceramic body comprising:

a) sintering, at a sintering temperature between 1550° C. and 1800° C., a mixture of aluminum nitride powder with a sintering aid package sufficient to form a sintered body having a second phase with at least one calcium containing component, at least one second phase composition defined by the region including and within lines B-A-$C_1$ in FIG. 4, but not including B;

b) cooling said sintered body to at least below 1500° C.; and c) heat treating said sintered body at a temperature of at least 1300° C. but below the sintering temperature for a period of time sufficient to cause said calcium containing components of said second phase to at least partially dewet from the aluminum nitride so as to contact the aluminum nitride, at a dihedral angle sufficient to provide a resistivity of at least about $10^8$ $\Omega$-cm.

A process for preparing a resistive, sintered aluminum nitride ceramic body comprising:

a) sintering, at a sintering temperature between 1550° C. and 1800° C., a mixture of aluminum nitride powder with a sintering aid package sufficient to form a sintered body having a second phase comprising at least one of CaYAl$_3$O$_7$ and CaYAlO$_4$ and at least one yttrium aluminate, b) cooling said sintered body to at least below 1500° C.; and c) heat treating said sintered body at a temperature of at least 1300° C. but below the sintering temperature for a period of time sufficient to cause said at least one of CaYAl$_3$O$_7$ and CaYAlO$_4$ of said second phase to at least partially dewet from the aluminum nitride so as to contact the aluminum nitride at a dihedral angle sufficient to provide a resistivity of at least about $10^8$ $\Omega$-cm.

A resistive, sintered aluminum nitride ceramic body comprising a cofired multilayer laminate containing at least one aluminum nitride ceramic layer between at least two dense metal layers, wherein said ceramic layer has a microstructure containing aluminum nitride grains and a second phase having at least one calcium containing component, said calcium containing component of said second phase being in contact with the aluminum nitride grains at a dihedral angle sufficient to provide a resistivity of at least about $10^8$ $\Omega$-cm and comprising at least one composition defined by the region including and within lines D-E-F-H-B.

A resistive, sintered aluminum nitride ceramic body comprising a cofired multilayer laminate containing at least one aluminum nitride ceramic layer between at least two dense metal layers, wherein said ceramic layer has a microstructure containing aluminum nitride grains and a second phase having at least one calcium containing component, said calcium containing component of said second phase being in contact with the aluminum nitride grains at a dihedral angle sufficient to provide a resistivity of at least about $10^8$ Ω-cm and comprising at least one composition defined by the region including and within lines B-A-$C_1$ in FIG. 4, but not including B.

A resistive, sintered aluminum nitride ceramic body comprising a cofired multilayer laminate containing at least one aluminum nitride ceramic layer between at least two dense metal layers, wherein said ceramic layer has a microstructure containing aluminum nitride grains and a second phase comprising at least one of $CaYAl_3O_7$ and $CaYAlO_4$ and at least one yttrium aluminate, said $CaYAl_3O_7$ or $CaYAlO_4$ components of said second phase being in contact with the aluminum nitride grains at a dihedral angle sufficient to provide a resistivity of at least about $10^8$ Ω-cm.

The above compositional, physical and electronic characteristics are also observed in co-fired multilayer AlN sintered bodies in accordance with the present invention, having multiple alternating layers of metal and ceramic. The co-fired bodies exhibit dimensional control without significant geometric distortion.

DETAILED DESCRIPTION OF THE INVENTION

Figure 1:
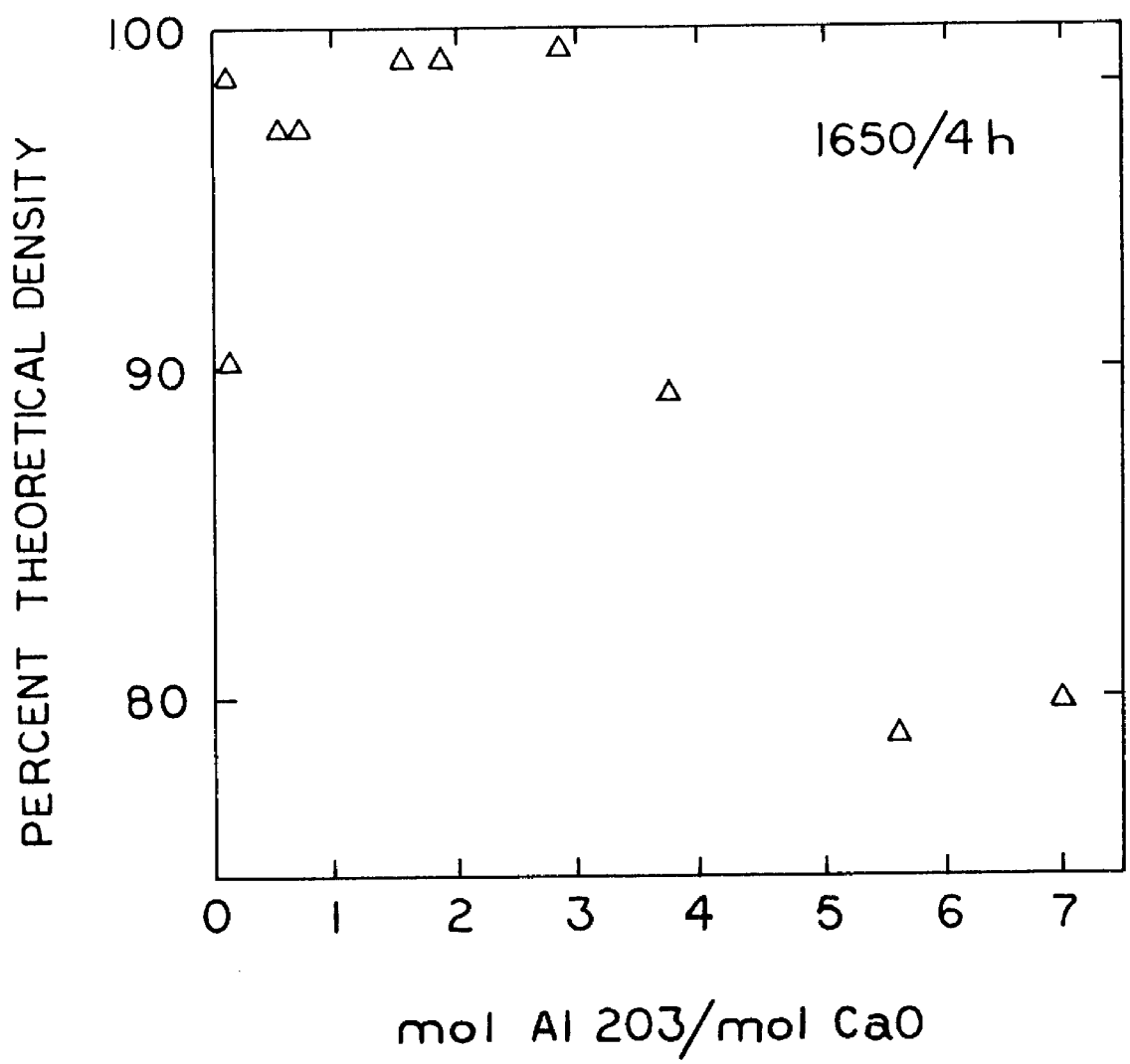
FIG. 1 is a graphical representation of aluminum nitride percent theoretical density plotted versus molar ratio of alumina, based on available oxygen from aluminum nitride, to calcia present in a yttria+calcia sintering aid.

According to the present invention, the formation of polycrystalline aluminum nitride sintered bodies having the density, resistivity, thermal conductivity, silicon thermal expansion match and dielectric properties required for electronic packaging applications has been achieved by pressureless sintering at low sintering temperatures between about 1500° C. to about 1800° C., but more preferably between about 1600° C. to about 1700° C. This temperature regime is suitable for the simultaneous sintering of multiple metal and ceramic layers (co-fired multilayer substrates) achieving dimensional stability without geometric distortion.

We have identified sintered aluminum nitride bodies having at least 90% theoretical density and a thermal conductivity of at least 100 W/m-K comprising aluminum nitride and a second phase corresponding to a particular region of a compositional phase diagram for the system and containing at least one compound comprising the mixed oxides of calcium, yttrium, and aluminum, which may include the quaternary compound $CaYAl_3O_7$. We have observed these characteristics in co-fired multilayer AlN sintered bodies, having multiple alternating layers of metal and ceramic.

However, even when density and thermal conductivity are met, we have found that the second phase achieved may result in resistivity of the sintered aluminum nitride body which is too low to be suitable for use in electronic packaging applications. We have further found that second phase compositions which exhibit this phenomenon may fall into preferred regions of the compositional phase diagram, and have identified certain second phase compositions which are actually rendered conductive by normal aluminum nitride processing conditions.

We have now found that high resistivity, polycrystalline aluminum nitride bodies can be produced which exhibit target density and thermal conductivity properties, and which are excellent for electronic packaging applications despite the existence of potentially conductive second phase compositions within preferred regions of the compositional phase diagram.

Components of the mixture which is sintered to form the polycrystalline body include aluminum nitride powder, preferably having a low oxygen content (such as F-grade sold by Tokuyama Soda), a conventional binder such as polyvinylbutyral (PVB) and the synergistic sintering aid package in an amount calculated to be effective in removing available oxygen from the aluminum nitride under sintering conditions.

The sintering aid comprises at least two components, at least one metal compound of Group IIa, preferably calcium, and at least one metal compound of Group IIIa or the rare earths (lanthanides), preferably yttrium. The Group IIa, IIIa, or rare earth metal compounds are preferably metal oxides. Alternatively, one or both components are compounds convertible to the metal oxide in the sintering environment and which have no constituents which would be deleterious to the properties desired in the sintered AlN body. The metal oxide must be capable of reacting at a temperature within the sintering regime with alumina from the AlN grains to form a second phase in the sintered body. An example of a suitable metal oxide of Group IIa is calcia and of Group IIIa is yttria.

Group IIa metals that provide the desired second phase and, compounds of which can be used as effective sintering aids in the present invention, include Ca, Sr, Ba and mixtures thereof. Group IIIa or rare earth metals that provide the desired second phase and, compounds of which can be used as effective sintering aids in the present invention, include Y, La, Ce, Nd, Sm, Eu, Gd, Tb, Dy, Ho, Er, Tm, Yb, Lu, and mixtures thereof. Compounds of the above metals which may function as sintering aids for aluminum nitride according to the present invention include but are not limited to oxides, carbonates, nitrates, sulfates, fluorides and mixtures thereof.

It should be understood that the terms "sintering aid" and "sintering additive" refer generally to those elements or compounds that are added into the aluminum nitride powder mixture, and that "sintering phase" refers to the particular components that exist at the sintering temperature and which enhance sintering of the ceramic. Further exemplification of the sintering aid package will be represented below by an embodiment which comprises the Group IIa metal oxide component calcia and the Group IIIa metal oxide component yttria.

The amount of available oxygen in any given aluminum nitride powder can be determined by sintering a sample of the AlN powder with enough yttria (or other IIIa/rare earth compound) to ensure that all available oxygen has reacted (using a calculated stoichiometric excess), and then analyzing the sample such as by X-ray diffraction for the particular second phase yttrium-aluminum-oxygen compound formed. The available oxygen for this arbitrary powder is then back calculated from the yttria to alumina proportion of the formed phase to determine a desired alumina to calcia (or other IIa metal compound) ratio, based on the alumina equivalent of the available oxygen as calculated by the above method, in relation to calcia (and yttria) in ratios needed to achieve the compositional triangle I (region defined by the lines B-A-C) (FIG. 4) as set forth in more detail below. For any starting aluminum nitride powder composition, an optimal presintering alumina to calcia molar ratio can be calculated, or its equivalent presintering alumina (A) to Q compound molar ratio "A/Q" where Q represents at least one Group IIa metal compound, in the appropriate sintering temperature regime. If alumina is added to the aluminum nitride powder to be sintered, a corresponding increase in the amount of sintering aid is required to getter the additional oxygen present.

According to the present invention, the sintering temperature for the aluminum nitride is to be about 1500° C. to about 1800° C., preferably about 1500° C. to about 1700° C. and preferably in a controlled sintering environment. In one embodiment, the sintering aid package is preferably selected so as to achieve a calculated A/Q value of about 0.5 to about 3, more preferably about 1 to about 2, and most preferably about 1.5 to about 2. Although the preferred A/Q ratio will provide some enhancement of properties throughout the above sintering temperature range, it is preferable to limit the sintering temperature to the lower range for reasons of economics and performance. As discussed below, the sintering conditions (including control of volatiles and/or sintering atmosphere) should be selected so as to retain the desired second phase components in the sintered body.

FIG. 1 demonstrates the percent of theoretical density which is achieved in the sintering of aluminum nitride using yttria and calcia as a sintering aid package, as a function of the A/Q, or in this case, alumina:calcia, ratio. The molar ratio of yttria to calcia for the examples represented in FIGS. 1–3 is about 0.25 to about 10.5.

The various mixtures were sintered at a temperature of 1650° C. for a period of 4 hours. FIG. 1 demonstrates that there is a peak in the percent of theoretical density achieved at a value of the A/Q ratio of about 1.5 to about 2 (e.g. about 1.5:1 to about 2:1) which plateaus until the A/Q ratio of about 3:1 is reached, thus defining starting mixtures for that system which lead to high density under sintering conditions which achieve the desired second phase.

Figure 2:
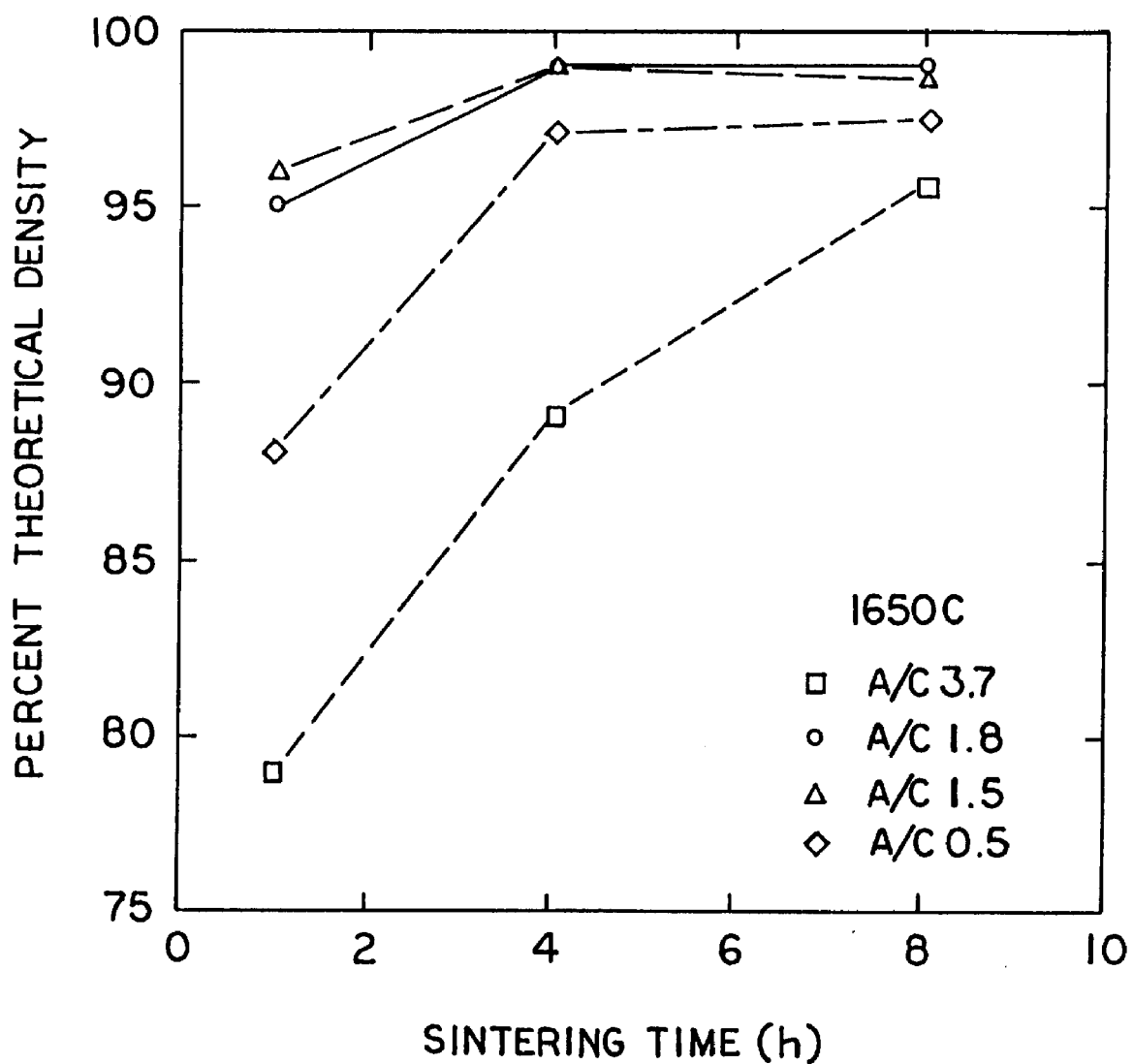
FIG. 2 is a graphical representation of aluminum nitride percent theoretical density plotted versus sintering time at 1650° C. for sintering aids having the molar relationships to alumina as shown in FIG. 1.

The synergistic effect of the sintering aid package according to the present invention is further demonstrated in FIG. 2 which represents the percent of theoretical density achieved as a function of sintering time at 1650° C. for the starting mixtures defined above. Each curve plotted on the graph represents a different A/Q ratio. It is demonstrated by the data represented in FIG. 2 that the starting mixtures with an A/Q ratio of about 1.5:1 to about 1.8:1 lead to high density even at short sintering times such as within one to four hours, as compared to mixtures having a higher or lower ratio requiring up to eight hours to achieve acceptable density.

Figure 3:
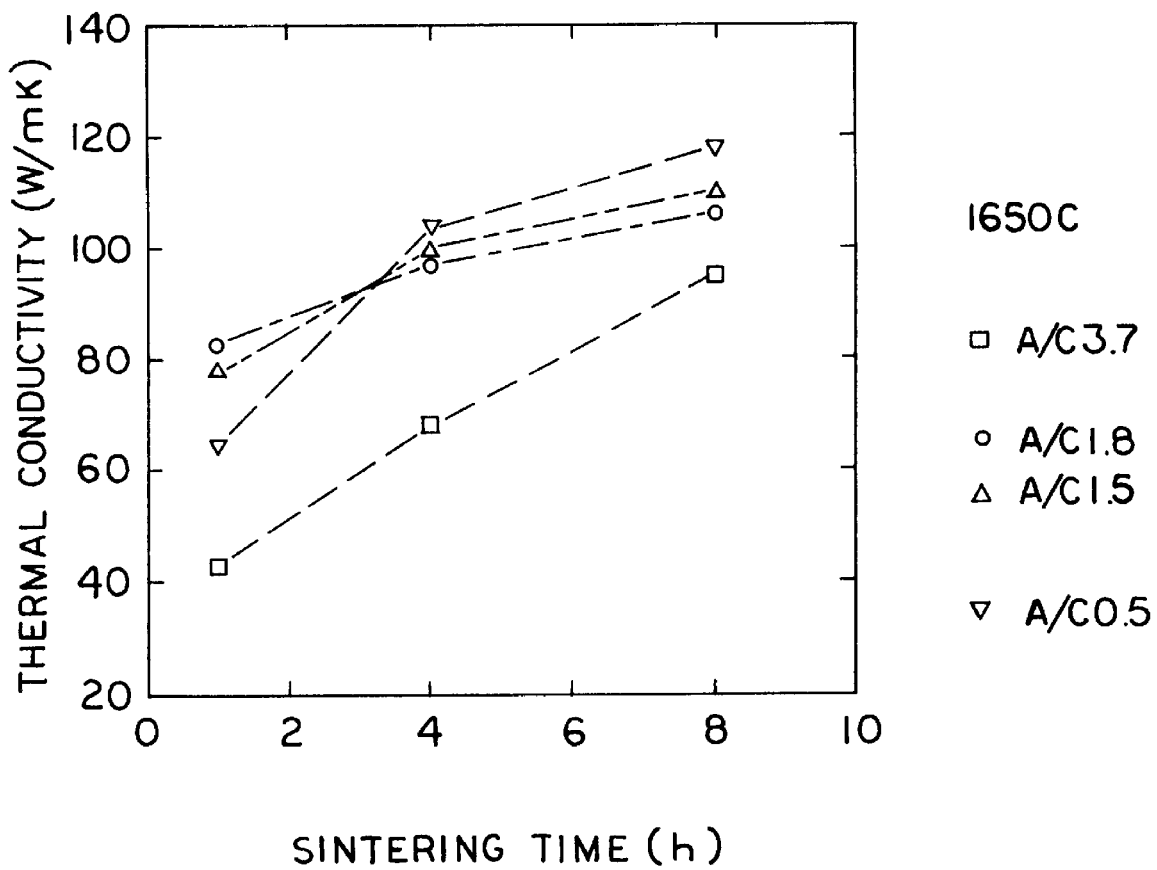
FIG. 3 is a graphical representation of thermal conductivity versus sintering time at 1650° C. for sintering aids having the molar relationships to alumina as shown in FIG. 1.

FIG. 3 demonstrates the thermal conductivity in W/m-K (measured by the laser flash technique) as a function of sintering time at 1650° C. for the same samples as represented in FIG. 2. The higher density samples also exhibited the higher thermal conductivity.

Figure 4:
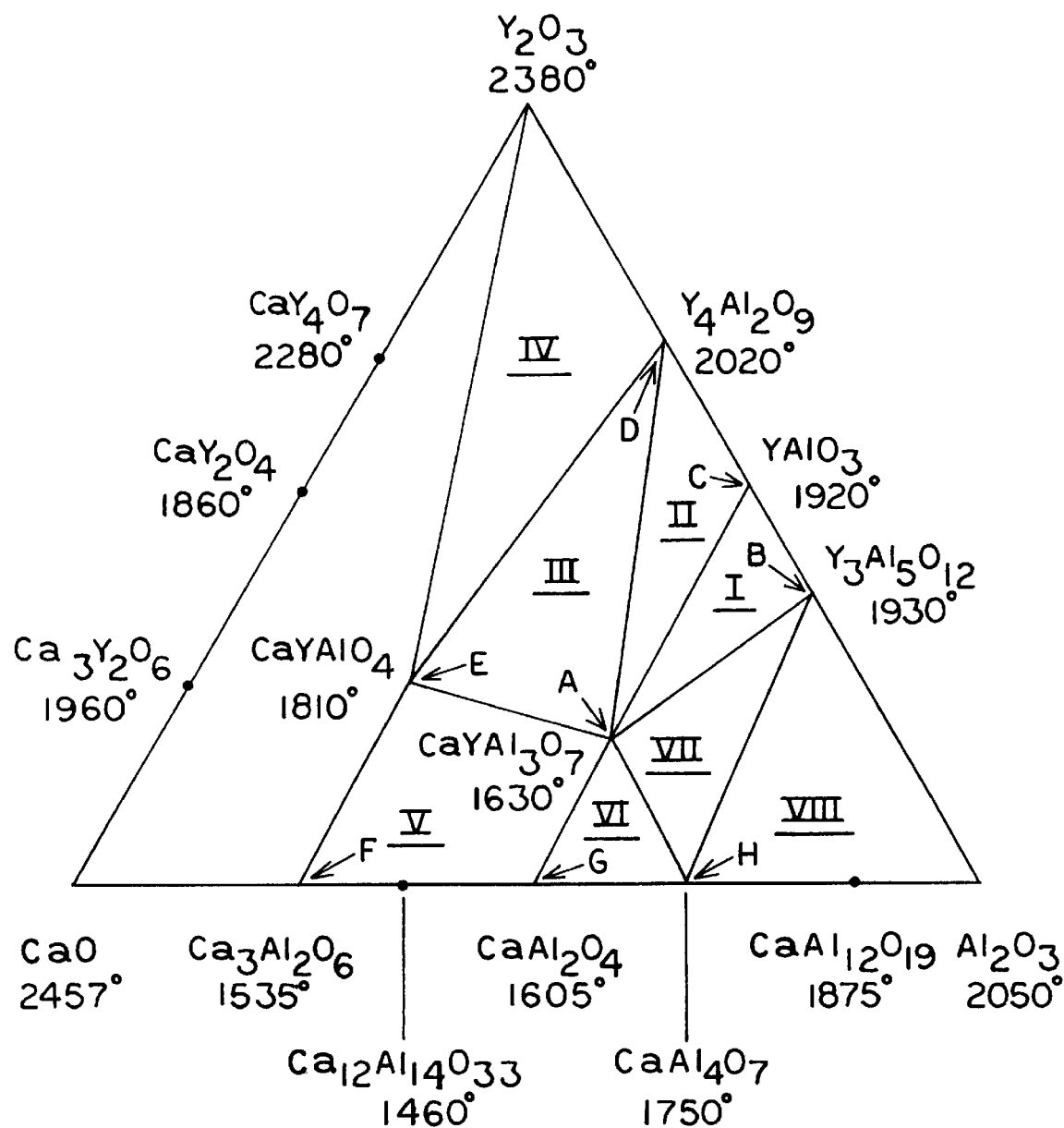
FIG. 4 is a mol percent ternary diagram of possible resultant second phase components of sintered aluminum nitride represented by their metal oxides.

X-ray diffraction analysis of the samples described above and represented by the data plotted in FIGS. 2 and 3, revealed that the desired properties of high density coincident with high thermal conductivity occurred when the second phase was defined within the lines B-A-C of the ternary diagram of FIG. 4, such as when a quaternary compound containing the components Ca, Y, Al, and O was present in the ceramic body after sintering.

Thus, it is demonstrated by the present invention that, at low sintering temperatures, it is highly desirable, in order to achieve both the desired high density and high thermal conductivity in the resultant sintered aluminum nitride body, that a sintering aid package of Groups IIa and IIIa/rare earth metal (compounds), such as calcia and yttria, in effective ratios with respect to native alumina as measured by available oxygen in the aluminum nitride powder be utilized with an appropriate sintering phase being maintained in the body during sintering and that a second phase be formed in the ceramic which contains quaternary or pseudoquaternary compounds comprising the mixed oxides of aluminum and the sintering aid metals. High ceramic density and high thermal conductivity is accomplished by reaction of the sintering phase with native alumina to achieve the second phase components desired and to minimize or eliminate any residual carbon and/or alumina (available oxygen) remaining in the aluminum nitride body.

As used herein, by quaternary is meant that a specific four component composition is formed which is a stoichiometric oxide of the three metals: aluminum, Group IIa sintering aid metal (represented by calcium), and Group IIIa/rare earth sintering aid metal (represented by yttrium). By pseudoquaternary is meant that a four component composition is formed which is a non-stoichiometric, substituted metal aluminate, in which one of the sintering aid metals forms the aluminate and the other substitutes within the structure of the compound either interstitially or for one of the other metals.

FIG. 4 is a ternary diagram of possible resultant second phase components of sintered aluminum nitride represented by the oxides of aluminum and the sintering aid metals calcium (Ca) and yttrium (Y). It will be appreciated that these sintering aid metals are exemplified and represent the preferred metals, but that they are not the only such metals, any Group IIa metal (in place of Ca) or any Group IIIa metal or rare earth metal (lanthanides) (in place of Y) being suitable as discussed above. According to the present invention, the starting mixture of sintering aids in relation to the available oxygen (alumina) forms a low melting ternary oxide (quaternary compound) liquid of $CaO\text{-}Al_2O_3\text{-}Y_2O_3$ at a low temperature (above about 1525° C. for this preferred system) within the composition defined by triangular area I in FIG. 4 within the lines B-A-C. High density and high thermal conductivity are achieved by the liquid phase sintering of aluminum nitride, most preferably with a starting sintering phase liquid having the composition at or about point A in FIG. 4. Sintering at temperature proceeds with a phase evolution as a function of time, preferably without leaving triangle I bounded by the lines B-A-C.

For example, with a given AlN powder (i.e., having an available alumina content) and using an appropriate sintering aid mixture of calcia and yttria, the quaternary liquid and a Y-Al-O solid phase forms corresponding to the composition at point A, at about 1630° C. Unexpectedly, these systems provide effective sintering at temperatures up to about 80° C. less than this eutectic. Continued sintering at a temperature between about 1550°–1800° C. will cause a progressive change in the sintering phase liquid from the quaternary composition and Y-Al-O eventually to the pseudo-quaternary composition end point. Based upon known binary eutectics, lower ternary eutectics could exist for other components. It is most preferable, that the liquid sintering phase be retained within triangle I bounded by the lines B-A-C, as optimally high density and/or thermal conductivities are exhibited by AlN sintered with compositions within that area.

The liquid sintering phase composition is maintained within the preferred compositional triangle by preventing the volatilization and dissipation of the liquid, such as by limiting the free space within a sintering container with respect to the volume of the sintering ceramic part, by supplying volatile components of the sintering aid liquid in excess in the green body, or by supplying components of the sintering aid liquid in vapor form in the sintering atmosphere.

Although lower temperature liquid is possible having compositions containing the four components outside the triangle bounded by the lines B-A-C, the lowest temperature eutectic is a combination of 1 YAP and 6 calcium aluminate ($CaAl_2O_4$), and does not correspond to the quaternary or pseudo-quaternary compositions formed at an effective sintering temperature to provide acceptable density or thermal conductivity in the sintered AlN body.

Sintered aluminum nitride bodies consistently having higher densities coincident with higher thermal conductivities are those which have a second phase in the triangle bounded by and including the lines B-A-C. The final sintered body contains a second phase which corresponds to the quaternary compound or pseudo-quaternary compound described herein.

The most preferred second phase composition falls within the phase triangle bounded by the vertices $CaYAl_3O_7$ corresponding in FIG. 4 to point "A", the pseudo-quaternary $YAlO_3$:Ca (YAP:Ca) with substituted calcium corresponding to a point adjacent to "C" and just within the triangle bounded by the lines B-A-C "$C_1$", and $Y_3Al_5O_{12}$ (YAG) corresponding to point "B", and includes the lines connecting the vertices A–$C_1$ and A–B.

Sintered aluminum nitride bodies, also having a high percentage of theoretical density and high thermal conductivity, can exhibit second phase compositions defined by other areas of the phase diagram of FIG. 4 having as one vertice point "A" corresponding to the quaternary composition $CaYAl3O_7$, namely triangle II bounded by and preferably including the lines D-A-$C_1$; triangle III bounded by and preferably including the lines D-E-A-D; triangle VI bounded by and preferably including the lines G-H-A-G; and triangle VII bounded by and preferably including the lines B-A-H-B; and quadrilateral V bounded by and preferably including the lines F-G-A-E-F, as exemplified below. Included within some of these listed areas, and within the region D-E-F-H-B is point "E", corresponding to the quaternary composition $CaYAlO_4$.

Second phase compositions represented by the areas within region D-E-F-H-B, but outside triangle I bounded by lines B-A-C, can exist in high density, high thermal conductivity aluminum nitride sintered bodies as a result of a shift of the second phase compositions from the preferred triangle I to adjacent or contiguous areas (sharing point "A") at low sintering temperatures due to volatilization of species such as CaO and/or $Al_2O_3$ or reduction of triangle I compositions, such as $CaYAl_3O_7$ to $CaYAlO_4$. This volatilization/reduction is more pronounced at the edges of the bodies than at the in terior.

High density and high thermal conductivity in these instances result from the second phase compositions existing within triangle I having been present as the sintering phase during the sintering process for a period of time which is effective to densify the aluminum nitride and getter oxygen (and residual carbon, if any) in order to attain the target properties. Thus, there is second phase evolution away from triangle I possible, even at low sintering temperatures, which would result in acceptable density and thermal conductivity, and also dimensional stability suitable for the preparation of low camber metal ceramic laminates.

Phase evolution can occur in a reducing atmosphere, such as utilized in a refractory metal furnace to protect furnace components in the sintering temperature regime, to convert $CaYAl_3O_7$ to $CaYAlO_4$ by volatilization of $Al_2O_3$. The existence of these compositions, particularly $CaYAl_3O_7$ is a signature of having sintered within the compositional triangle I. For example, sintered aluminum nitride bodies having high density and high thermal conductivity have been analyzed to reveal that the second phase comprised YAP, $CaYAl_3O_7$ and $CaYAlO_4$, even though these three compositions are not at equilibrium with each other at any temperature within the phase diagram. This second phase composition resulted from sintering within the compositional triangle I with subsequent reduction of $CaYAl_3O_7$ to $CaYAlO_4$.

Thus, although the most preferred second phase compositional region for sintering is within triangle I, the final sintered aluminum nitride body having the target density and thermal conductivity charact eristics may contain second phase compositions within triangle I as well as adjacent regions which together are bounded by lines B-D-E-F-H-B of the phase diagram.

We have found that sintered aluminum nitride bodies which contain second phase compositions defined, particularly within triangles II and III, but also within areas V and VI and VII of the phase diagram of FIG. 4 exhibit the target properties of density and thermal conductivity required for electronic substrates. In addition to compositions described in FIG. 4 (phase diagram) some non equilibrium compositions are possible, for example, $CaYAl_3O_7$ (T-Phase) with one or more yttria aluminates not shown to be in equilibrium. Further examples include T-Phase in combination with YAG and/or YAP or T-Phase and/or I-Phase in combination with YAG and/or YAP.

Sintered aluminum nitride bodies are thus achieved according to the present invention having at least about 90% and preferably about 95% theoretical density and a thermal conductivity of at least 100 W/m-K comprising aluminum nitride and a second phase in the desired phase diagram region, containing at least one compound comprising the mixed oxides of i) at least one metal of Group IIa, ii) at least one metal of Group IIIa or rare earth, and iii) aluminum, which may include a quaternary compound comprising Q, R, Al, and O wherein Q is a Group IIa metal or mixtures thereof and R is a Group IIIa or rare earth metal or mixtures thereof. Utilizing a preferred sintering aid package of calcia and yttria according to the present invention, a sintered aluminum nitride body is obtained having at least about 90% and preferably about 95% theoretical density and a thermal conductivity of at least 100 W/m-K comprising aluminum nitride and a second phase in the desired phase diagram region containing at least one compound comprising the mixed oxides of calcium, yttrium, and aluminum, which may include the quaternary compound $CaYAl_3O_7$.

Although not every additive liquid present at sintering temperatures will perform the sintering functions of densification and oxygen gettering, the sintering phase liquids containing the above described quaternary and pseudo-quaternary compounds are formed at relatively low sintering temperatures, and permit the densification and oxygen gettering functions of the sintering phase liquid to take place in the low temperature regime. By low temperature, it is meant that the temperature at which sintering and these functions occur is comparatively lower than the temperature at which they would ordinarily be expected to occur, if at all. For the preferred invention, this is typically at a temperature below about 1800° C., and preferably below about 1700° C.

Figure 5:
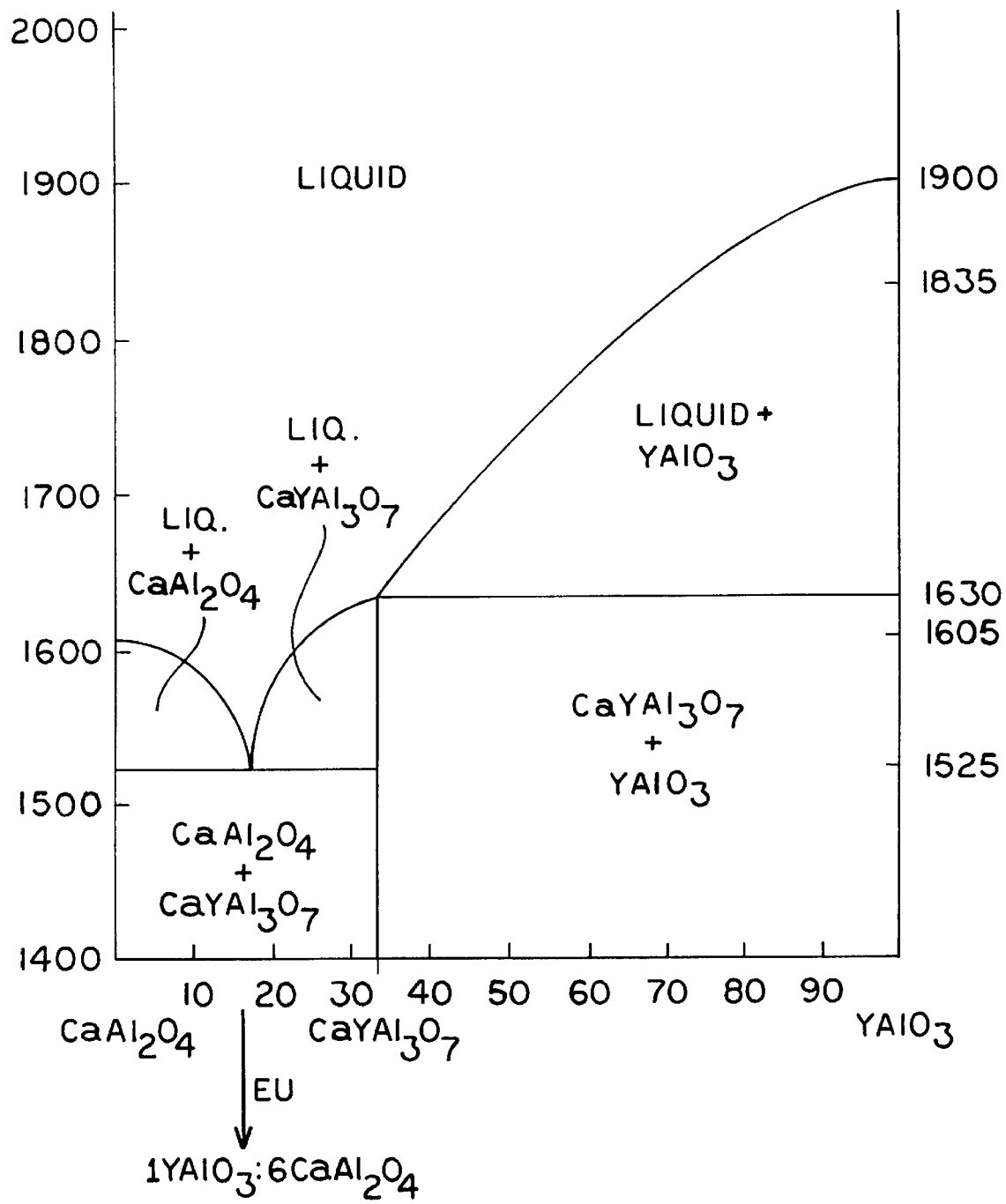
FIG. 5 is a pseudo-binary phase diagram, as a function of temperature, of second phase species taken along the lines C-A-G of FIG. 4.

FIG. 5 is a pseudo-binary phase diagram, as function of temperature, of second phase species (metal aluminates) taken along the line C-A-G of FIG. 4. Although a lower temperature liquid is shown having compositions containing the four components of the desired quaternary or pseudo-quaternary sintering compounds outside triangle I, the eutectic is a combination of 1 YAP and 6 calcium aluminate ($CaAl_2O_4$), and does not correspond to the quaternary or pseudo-quaternary compositions formed at an effective sintering temperature within triangle I to provide acceptable density or thermal conductivity in the sintered AlN body. Although the diagram of FIG. 5 demonstrates the phases for various Ca and Y aluminates at temperature, similar pseudo-binary diagrams for aluminates of other IIa and IIa/rare earth metals listed above can be constructed to select alternative sintering aid species included within the scope of the present invention, such as for example, erbium or barium aluminates.

In order to form the desired second phase liquid according to the invention, the molar ratio of the Group IIa metal oxide component Q to the Group IIIa or rare earth metal oxide component R is dependent upon the alumina (oxygen) content of the aluminum nitride powder, and is calculated to achieve the compositional ratios of the sintering phase within the region B-D-E-F-H-B of FIG. 4. The ratios of Q to R or Ca to Y, as a function of available alumina (added if desired), can thus range between those values represented by points F and D, or G and C, or H and B of FIG. 4. It is preferred to achieve the sintering phase composition within triangle I, and thus the ratio, for example of Ca to Y is preferably that to achieve the compositions between $YAlO_3$ (point $C_1$) and $CaYAl_3O_7$ (point A), or most preferably greater than 0:1 to about 1:1.

In other words, the ratio of Q to R (Ca to Y) is not particularly meaningful independent of their relation to alumina. According to the invention, the ratios of Q to R (Ca to Y) to Al are to be provided and maintained (by low temperature sintering in a controlled sintering environment) within the desired region of the phase diagram, i.e., the appropriate triangles (or quadrilateral) of FIG. 4, and most preferably about point A, corresponding to $CaYAl_3O_7$.

The preferred weight ratios of the preferred sintering aids calcia (added as calcium carbonate) and yttria are from about 1:1 to about 1:3, where Tokuyama Soda F-grade AlN powder or an equivalent oxygen content AlN powder is used. For weight or molar ratios outside the appropriate ranges for the particular aluminum nitride powder (as a function of oxygen content) and sintering metal (compounds) used, there is a sudden drop in the density and/or the thermal conductivity of the resulting AlN product sintered at a given temperature.

The AlN powder, binder and sintering aid package powders are mixed and are formed into green bodies by conventional procedures, such as hot pressing or sheet casting. To form multilayer ceramic bodies, sheets of AlN green body are printed with a metal paste, such as metal pastes derived from the refractory metals molybdenum and tungsten, optionally having ceramic additives such as AlN. The printed green sheets are laminated together under heat and pressure prior to sintering to form a structure having multiple alternating layers of metal and ceramic. A process for making multilayer (alumina) ceramic-metal laminates for electronic packaging is described in Schwartz, "Multilayer Ceramics", *Mat. Res. Soc. Symip. Proc., Vol.* 40, pp 49–59 (1985), which is hereby incorporated by reference herein.

Sintering of the green body is carried out in a high temperature furnace, for example, a graphite or a refractory metal furnace. The sintering system must be configured to supply an atmosphere which contains nitrogen, and optionally hydrogen in an amount sufficient to protect furnace elements when a refractory metal furnace, e.g. tungsten, is utilized. The green body can be sintered in a ceramic crucible such as AlN or in a refractory metal crucible such as tungsten (when utilizing a refractory metal furnace).

The sintering process is begun with a ramping of the temperature from the ambient to the maximum temperature at which the AlN is held for a period of time which is effective to complete densification and oxygen gettering. It is unnecessary to utilize a separate binder burnout step when using the above sintering aid package. Binder burnout can be accomplished in situ within the sintering furnace.

At a temperature of about 1525° C. the liquid sintering phase which is formed from the sintering aid package contains the components Q-Al-R-O, preferably Ca-Al-Y-O. Oxygen is gettered by reaction of the liquid with alumina on the surface of the AlN grains, and with a portion of the oxygen extracted from the lattice of the AlN particles (together being the available oxygen). The temperature is increased to at least about 1500° C. and held for an effective period of time. At this temperature regime substantial densification occurs.

According to the present invention, aluminum nitride sintered bodies are prepared via a liquid sintering route which forms a quaternary or pseudoquaternary compound containing Q, R, Al, and O in the second phase during sintering. In a preferred embodiment, aluminum nitride sintered bodies are prepared via a liquid phase sintering route which forms the quaternary compound $CaYAl_3O_7$ in the sintering phase during sintering and retains that quaternary compound, or at least the second phase quaternary compound $CaYAlO_4$ or a second phase calcium substituted yttrium aluminate, preferably having an Al:Y ratio of about 1:1 to about 5:3, in the sintered body. If the quaternary composition corresponding to point "A" is not present, then a composition may be present which is located on the tie line between "A" and "E" of FIG. 4.

The aluminum nitride sintered bodies of the present invention are prepared by sintering aluminum nitride at low temperature in the presence of sintering aids such that the second phase sintering compositions formed during sintering are defined within the area of triangle I of the phase diagram of FIG. 4. The low sintering temperatures, according to the present invention, are generally about 1500° C. to about 1800° C., preferably about 1500° C. to about 1700° C.

It is most preferred that the sintering phase composition be started and maintained within triangle I, such as by methods set forth above. When sintering is begun in this compositional area, it is possible to maximize the amount of time during which effective sintering occurs in the presence of preferred second phase compositions, such as $CaYAl_3O_7$.

However, acceptable properties of high density and high thermal conductivity are obtained when the sintering phase composition begins in triangle I, remains for an effective amount of time to provide densification and oxygen gettering, and then undergoes reduction or volatilization to form second phase compositions in adjacent or contiguous areas, within the region of the phase diagram defined within and including lines D-E-F-H-B.

It is possible, though much more difficult to control, to begin the sintering process with a sintering phase composition within the areas adjacent to triangle I, and then to move into triangle I by volatilization for an effective period of densification and oxygen removal sufficient to provide the target density and thermal conductivity. For example, considering that calcia and alumina are volatilized during sintering, it is possible to start outside of triangle I in phase diagram FIG. 4 and vector away from calcia and alumina to traverse triangle I for an effective period of time. Again, the presence of $CaYAl_3O_7$, with or without its reduction product $CaYAlO_4$ is an analytical signature that triangle I may have been traversed.

According to the present invention, therefore, a sintered aluminum nitride body is obtained having a density greater than 90% (preferably greater than 95%) of theoretical and a thermal conductivity of greater than about 100 W/m-K, preferably greater than about 120 W/m-K, wherein said body contains a second phase composition, preferably comprising $CaYAl_3O_7$, $CaYAlO_4$ or at least one calcium-substituted yttrium-aluminate, having the composition defined by the region including and within the lines D-E-F-H-B in FIG. 4.

In a preferred embodiment a sintered aluminum nitride body is obtained having a density greater than 95% of theoretical and a thermal conductivity of greater than about 100 W/m-K, wherein said body contains a second phase comprising a composition, such as $CaYAl_3O_7$ or at least one calcium substituted yttrium aluminate, defined by the region including and within the lines $B-A-C_1$ in FIG. 4. As described above, an amount of yttria is utilized to produce or approximate YAG or YAP based upon the alumina equivalents calculated, together with the amount of calcia required to achieve the compositional triangle $B-A-C_1$.

SPECIFIC EXAMPLES

Example A

Aluminum nitride powder (available from Tokuyama Soda Co, Grade F) was mixed with 1 wt.% yttria (based on the weight of the aluminum nitride), 1 wt.% $CaCO_3$ and 1.5 wt% polyvinylbutyral (PVB) as a binder. The mixture was dried and pressed at 16,000 psi into a 0.8 inch diameter pellet and sintered in a graphite furnace in a nitrogen atmosphere at a temperature of 1650° C. for 4 hours. The resulting AlN ceramic had a density of 99% of the theoretical value, a thermal conductivity of 101 W/m, and contained as a second phase, the quaternary compound $CaYAl_3O_7$.

EXAMPLES 1–47

The sintered aluminum nitride bodies tested in examples 1–47 were prepared according to the procedure set forth in example A, except for the variables listed in Table I. Aluminum nitride powder (Tokuyama Soda F-Grade) was sintered utilizing $CaCO_3$ and yttria sintering aids in weight percents based upon aluminum nitride as set forth in Table I. These weight percents of sintering aids were calculated to eliminate available oxygen based on alumina content determined experimentally. The green body, having a PVB binder (1.5 wt%) was sintered at the maximum temperature indicated in Table I for the number of hours also indicated. Sintering took place in the furnace types indicated in Table I. The green bodies were sintered in an aluminum nitride crucible in a nitrogen atmosphere in the graphite furnace and a nitrogen/10% hydrogen atmosphere in the refractory metal furnace (hydrogen added to protect the furnace elements).

Table I reports the absolute density, percent of theoretical density, thermal conductivity and second phase content exhibited by the sintered AlN body. Percentages of theoretical density greater than 90% and generally greater than 95% were demonstrated, as well as thermal conductivities in excess of 100 W/mK. The second phase contents were analyzed and are indicated in Table I with respect to the corresponding compositional triangle of FIG. 4 in which the second phase is located.

TABLE I

| EXAMPLE | SINTERING Temp/Time | Sintering Aid wt % $CaCO_3$ | Sintering Aid wt % $Y_2O_3$ | Density g/cc | % of Theoretical Density | k (W*mK) | 2nd Phase content | Phase Region | Furnace |
|---|---|---|---|---|---|---|---|---|---|
| 1 | 1550/16 h | 1.0 | 0.5 | 3.29 | 99 | 117 | YAG + T | I | RMF |
| 2 | 1550/16 h | 1.0 | 1.0 | 3.24 | 99 | 110 | YAG + T | I | RMF |

TABLE I-continued

| EXAMPLE | SINTERING Temp/Time | Sintering Aid wt % CaCO$_3$ | wt % Y$_2$O$_3$ | Density g/cc | % of Theoretical Density | k (W*mK) | 2nd Phase content | Phase Region | Furnace |
|---|---|---|---|---|---|---|---|---|---|
| 3 | 1550/16 h | 1.0 | 3.0 | 3.16 | 96 | 110 | YAG + YAP + T | I | RMF |
| 4 | 1600/8 h | 1.0 | 0.5 | 3.23 | 99 | 107 | T (?) | I | GRF |
| 5 | 1600/8 h | 1.0 | 1.0 | 3.15 | 99 | 105 | T + CA | VI | GRF |
| 6 | 1600/8 h | 1.0 | 3.0 | 3.20 | 96 | 110 | YAG, YAP, T | I | GRF |
| 7 | 1600/8 h | 3.0 | 0.5 | 3.15 | 96 | 104 | YAG, CA$_2$ | VII | GRF |
| 8 | 1600/8 h | 3.0 | 1.0 | 3.20 | 98 | 105 | YAG, (T), (CA$_2$)? | VII | GRF |
| 9 | 1600/16 h | 1.0 | 0.5 | 3.22 | 99 | 116 | T, C$_{17}$A$_7$ | V | RMF |
| 10 | 1600/16 h | 1.0 | 1.0 | 3.20 | 98 | 120 | T, YAG (?) | I | RMF |
| 11 | 1600/16 h | 0.5 | 3.0 | 3.27 | 99 | 141 | YAG + YAP + T | I | RMF |
| 12 | 1600/16 h | 1.0 | 3.0 | 3.25 | 99 | 140 | YAP + T | I | RMF |
| 13 | 1600/64 h | 1.0 | 0.5 | 3.20 | 98 | 138 | YAG, CA$_2$, T | VII | GRF |
| 14 | 1600/64 h | 1.0 | 1.0 | 3.21 | 98 | 144 | YAG, T, CA$_2$ | VII | GRF |
| 15 | 1600/64 h | 0.5 | 3.0 | 3.15 | 96 | 140 | YAG, YAP, T | I | GRF |
| 16 | 1600/64 h | 1.0 | 3.0 | 3.20 | 97 | 151 | YAG, YAP, (T?) | I | GRF |
| 17 | 1650/4 h | 1.0 | 1.0 | 3.24 | 99 | 101 | T, C$_{12}$A$_7$ | V | GRF |
| 18 | 1650/4 h | 0.5 | 3.0 | 2.96 | 90 | 109 | YAG, YAP, (T?) | I | GRF |
| 19 | 1650/4 h | 1.0 | 3.0 | 3.25 | 99 | 118 | YAG, YAP, T | I | GRF |
| 20 | 1650/4 h | 3.0 | 0.5 | 3.18 | 97 | 108 | CA, T, C$_{12}$A$_7$ | V | GRF |
| 21 | 1650/4 h | 3.0 | 1.0 | 3.18 | 97 | 106 | C$_{12}$A$_7$ | V | GRF |
| 22 | 1650/8 H | 0.5 | 0.5 | 3.12 | 96 | 100 | CA$_2$, YAG (?) | VII | GRF |
| 23 | 1650/8 h | 1.0 | 0.5 | 3.23 | 99 | 107 | T | VII | GRF |
| 24 | 1650/8 h | 0.5 | 1.0 | 3.27 | 100 | 101 | YAG | VII | GRF |
| 25 | 1650/8 h | 1.0 | 1.0 | 3.23 | 99 | 112 | CA + CA$_2$ + T | VI | GRF |
| 26 | 1650/8 h | 0.5 | 3.0 | 3.05 | 93 | 133 | YAG + YAP + T | I | GRF |
| 27 | 1650/8 h | 1.0 | 3.0 | 3.25 | 99 | 137 | YAG + YAP + T | I | GRF |
| 28 | 1650/8 h | 3.0 | 0.5 | 3.19 | 98 | 117 | CA$_2$, T | VII | GRF |
| 29 | 1650/8 h | 3.0 | 1.0 | 3.19 | 98 | 120 | YAG | VII | GRF |
| 30 | 1700/1 h | 0.5 | 3.0 | 3.20 | 97 | 106 | YAG, YAP, (T) | I | GRF |
| 31 | 1700/1 h | 1.0 | 3.0 | 3.25 | 99 | 108 | YAG, YAP, T | I | GRF |
| 32 | 1700/4 h | 0.5 | 1.0 | 3.25 | 99 | 102 | YAG, (YAP?) | B-C | GRF |
| 33 | 1700/4 h | 1.0 | 0.5 | 3.23 | 99 | 104 | YAG, CA$_2$ | B-H | GRF |
| 34 | 1700/4 h | 1.0 | 1.0 | 3.23 | 99 | 102 | YAG, CA$_2$ | B-H | GRF |
| 35 | 1700/4 h | 0.5 | 3.0 | 3.26 | 99 | 143 | YAG, YAP, (G) | I | GRF |
| 36 | 1700/4 h | 1.0 | 3.0 | 3.26 | 99 | 132 | YAG, YAP, T | I | GRF |
| 37 | 1700/4 h | 3.0 | 0.5 | 3.17 | 97 | 116 | CA$_2$, CA(?), T | VI | GRF |
| 38 | 1700/4 h | 3.0 | 1.0 | 3.18 | 97 | 114 | T (?) | "A" | GRF |
| 39 | 1700/8 h | 0.25 | 0.5 | 3.27 | 100 | 100 | YAG, CA$_2$, (T) | VII | GRF |
| 40 | 1700/8 h | 0.25 | 1.0 | 3.27 | 100 | 104 | YAG, (CA$_2$) | B-H | |
| 41 | 1700/8 h | 0.5 | 1.0 | 3.26 | 100 | 105 | YAG, CA$_2$, T | VII | GRF |
| 42 | 1700/8 h | 1.0 | 0.5 | 3.24 | 99 | 104 | YAG, (CA$_2$) | B-H | |
| 43 | 1700/8 h | 1.0 | 1.0 | 3.23 | 99 | 106 | YAG, (YAP) | B-C | GRF |
| 44 | 1700/8 h | 0.5 | 3.0 | 3.26 | 99 | 157 | YAG, YAP + (T?) | I | GRF |
| 45 | 1700/8 h | 1.0 | 3.0 | 3.26 | 99 | 146 | YAG + YAP + T | I | GRF |
| 46 | 1700/8 h | 3.0 | 0.5 | 3.19 | 98 | 123 | T + CA | A-G | GRF |
| 47 | 1700/8 h | 3.0 | 1.0 | 3.18 | 97 | 128 | T + CA | A-G | GRF |

YAG = Y$_3$Al$_5$O$_{12}$
YAP = YAlO$_3$
T = YCaAl$_3$O$_7$
CA = CaAl$_2$O$_4$
CA$_2$ = CaAl$_4$O$_7$
C$_{12}$A$_7$ = Ca$_{12}$Al$_{14}$O$_{33}$
( ) small amount
(?) small amount - missing peaks
GRF = Graphite Furnace
RMF = Refractory Metal Furnace

EXAMPLES 48–87

Aluminum nitride powder (Tokuyama Soda F-Grade) was sintered as in the above examples, except that in some examples (identified by the letter "C" before the example number) the sintering package was utilized in a ratio outside that calculated to result in the elimination of available oxygen based on alumina content determined experimentally. Table II reports the sintering aids, furnace, temperature and time utilized, as well as the results in terms of absolute density, percent of theoretical density, thermal conductivity, second phase content and phase region within the FIG. 4 phase diagram.

Sintering aid packages outside of the invention generally resulted in lower density of the sintered AlN product, as well as lower thermal conductivities, with second phase components being identified within the sintered body which fall outside the desired region of the phase diagram, namely compositional triangle IV of FIG. 4. Sintering aid packages within the scope of the invention result in high density and high thermal conductivity, even though the aggressively reducing conditions of the refractory metal furnace and hydrogen containing sintering atmosphere resulted in CaYAl$_3$O$_7$ ("A") being reduced to CaYAlO$_4$ ("E"), and second phase compositions being shifted out of triangle I of FIG. 4 to other desired regions.

It is demonstrated, however, that according to the present invention, a starting sintering aid package with an excess of a volatilizible component, such as calcia, can be utilized to form a starting sintering phase outside of triangle I, but upon volatilization of the calcia as a function of time, temperature and sintering environment, to move compositionally into a desired region of the phase diagram and achieve target density and thermal conductivity. However, the presence of an excess of a component such as yttria, will result in the desired sintering phase falling outside the desired region, and the target properties not being achieved (comparative examples).

sintered at 1625° C. for 10 hours to provide a sintered ceramic-metal body.

The sintered aluminum nitride contained a second phase which comprised $YAlO_3$ (YAP), $Y_4Al_2O_9$ (YAM), and the quaternary compound $CaYAl_3O_7$ as analyzed by X-ray diffraction. The sintered body exhibited a thermal conductivity of 142 W/mK and a percentage of theoretical density of greater than 98%. The camber of the sintered metal-aluminum nitride laminated sheet was measured at only 1.5

TABLE II

| Example | Sintering Temp/Time | Sintering Aid wt % $CaCO_3$ | Sintering Aid wt % $Y_2O_3$ | Density g/cc | % of theoretical Density | k (W/mK) | 2nd Phase content | Phase Region | Furnace |
|---|---|---|---|---|---|---|---|---|---|
| 48 | 1600/4 h | 3.0 | 0.5 | 2.91 | 88 | 80 | I + (T) | A-E | RMF |
| 49 | 1600/4 h | 1.0 | 1.0 | 3.24 | 99 | 99 | T + I | III | RMF |
| 50 | 1600/4 h | 3.0 | 1.0 | 2.93 | 89 | 84 | I + $C_{12}A_7$ | V | RMF |
| 51 | 1600/4 h | 5.0 | 1.0 | 2.84 | 86 | 80 | $C_{12}A_7$ + I + (T) | V | RMF |
| 52 | 1600/4 h | 7.0 | 1.0 | 2.82 | 85 | 78 | I + $C_{12}A_7$ | V | RMF |
| 53 | 1600/4 h | 1.0 | 3.0 | 3.10 | 94 | 100 | YAP + I + T | I | RMF |
| C 54 | 1600/4 h | 1.0 | 5.0 | 2.11 | 63 | 49 | Y + YAM + I | IV | RMF |
| C 55 | 1600/4 h | 1.0 | 7.0 | 2.15 | 64 | 48 | Y + YAM + I | IV | RMF |
| 56 | 1625/4 h | 3.0 | 0.5 | 3.08 | 93 | 90 | I + (T) | A-E | RMF |
| 57 | 1625/4 h | 1.0 | 1.0 | 3.25 | 99 | 107 | I + $C_{12}A_7$ | V | RMF |
| 58 | 1625/4 h | 3.0 | 1.0 | 3.09 | 94 | 94 | $C_{12}A_7$ + I | V | RMF |
| 59 | 1625/4 h | 5.0 | 1.0 | 2.96 | 90 | 91 | $C_{12}A_7$ + I | V | RMF |
| 60 | 1625/4 h | 7.0 | 1.0 | 2.96 | 89 | 85 | I + $C_3A$ + T | V | RMF |
| 61 | 1625/4 h | 1.0 | 3.0 | 3.19 | 96 | 111 | I + T | E-A | RMF |
| C 62 | 1625/4 h | 1.0 | 5.0 | 2.31 | 69 | 64 | YAM + I + Y | IV | RMF |
| C 63 | 1625/4 h | 1.0 | 7.0 | 2.30 | 68 | 41 | Y + YAM + I | IV | RMF |
| 64 | 1625/8 h | 3.0 | 0.5 | 3.15 | 95 | 109 | I + (?) + $C_3A$ | F-E | RMF |
| 65 | 1625/8 h | 1.0 | 1.0 | 3.24 | 99 | 117 | I + (T) | A-E | RMF |
| 66 | 1625/8 h | 3.0 | 1.0 | 3.17 | 96 | 112 | I | (E) | RMF |
| 67 | 1625/8 h | 5.0 | 1.0 | 3.11 | 94 | 110 | I | (E) | RMF |
| 68 | 1625/8 h | 7.0 | 1.0 | 3.06 | 92 | 102 | I + $C_3A$ | E-F | RMF |
| 69 | 1625/8 h | 1.0 | 3.0 | 3.23 | 97 | 143 | I | (E) | RMF |
| C 70 | 1625/8 h | 1.0 | 5.0 | 2.38 | 71 | 78 | YAM + Y + I | IV | RMF |
| C 71 | 1625/8 h | 1.0 | 7.0 | 2.43 | 72 | 76 | I + YAM + Y | IV | RMF |
| 72 | 1625/16 h | 3.0 | 0.5 | 3.16 | 95 | 127 | I + $C_{12}A_7$ | V | RMF |
| 73 | 1625/16 h | 1.0 | 1.0 | 3.23 | 99 | 141 | I + YAP + (T) | C-A-E | RMF |
| 74 | 1625/16 h | 3.0 | 1.0 | 3.17 | 96 | 128 | I + $C_{12}A_7$ | V | RMF |
| 75 | 1625/16 h | 5.0 | 1.0 | 3.12 | 94 | 130 | I + $C_{12}A_7$ | V | RMF |
| 76 | 1625/16 h | 7.0 | 1.0 | 3.07 | 93 | 122 | $C_{12}A_7$ + I | V | RMF |
| 77 | 1625/16 h | 1.0 | 3.0 | 3.24 | 98 | 168 | I | (E) | RMF |
| C 78 | 1625/16 h | 1.0 | 5.0 | 2.50 | 75 | 100 | I + YAM | IV | RMF |
| C 79 | 1625/16 h | 1.0 | 7.0 | 2.53 | 75 | 95 | Y + YAM + I | IV | RMF |
| 80 | 1650/4 h | 1.0 | 1.0 | 3.24 | 99 | 113 | T + I + $C_{12}A_7$ | V | RMF |
| 81 | 1650/4 h | 1.0 | 1.0 | 3.24 | 99 | 113 | T + I + $C_{12}A_7$ | V | RMF |
| 82 | 1650/4 h | 3.0 | 1.0 | 3.11 | 94 | 111 | $C_{12}A_7$ + T + I | V | RMF |
| 83 | 1650/4 h | 5.0 | 1.0 | 3.10 | 94 | 102 | I + $C_{12}A_7$ | V | RMF |
| 84 | 1650/4 h | 7.0 | 1.0 | 3.07 | 92 | 93 | I + $C_3A$ | E-F | RMF |
| 85 | 1650/4 h | 1.0 | 3.0 | 3.16 | 95 | 141 | I + YAM + T | D-E-A | RMF |
| C 86 | 1650/4 h | 1.0 | 5.0 | 2.53 | 76 | 83 | I + YAM + Y | IV | RMF |
| C 87 | 1650/4 h | 1.0 | 7.0 | 2.57 | 76 | 80 | YAM + Y + I | IV | RMF |

T = $YCaAl_3O_7$
I = $CaYAlO_4$ (in 2nd Phase content)
YAP = $YAlO_3$
YAM = $Y_4Al_2O_9$
Y = $Y_2O_3$
$C_3A$ = $Ca_3Al_2O_6$
$C_{12}A_7$ = $Ca_{12}Al_{14}O_{33}$
( ) = small amount
(?) = small amount, missing peaks
GRF = Graphite Furnace
RMF = Refractory Metal Furnace Example B Aluminium nitride powder (Tokuyama Soda F-Grade) was processed into a green body sheet with sintering aids in the proportion of 3 $Y_2O_3$: 0.5 CaO: 0.4 $Al_2O_3$ and a PVB binder. A tungsten metal paste (Tradename 2003, available from Ceronics Inc.) was applied to the green body to form a four layer laminate. The metal-ceramic laminate was mils per inch. The density, thermal conductivity and flatness of the sintered body was excellent.

The aluminum nitride sintered bodies prepared according to the above procedures have characteristics and properties desirable for electronic packaging applications. The AlN sintered body has a density greater than 90%, with greater than 95% being typically achieved.

We have found, however, that the electrical resistivities of aluminum nitride sintered bodies having second phase compositions in the areas I, II, III, V, VI and VII of the phase diagram of FIG. 4 are often too low for utilization as an insulating substrate for electronic packaging applications. Further, we have found that any second phase microstructure which contains a calcium aluminate, and to a certain extent, the calcium containing quaternary phase, exhibits lowered electrical resistivity. This phenomenon was found to be more pronounced in multilayer metal-ceramic packages, although it was found to be present in monolithic ceramic substrates as well.

The measurement of a large number of AlN substrates sintered with calcia and yttria containing sintering aids has revealed that the bulk D. C. ceramic resistance can be unacceptably low for electronic packaging applications (i.e. less than $10^8$ Ω as measured with 1 cm pressure contacts at 100 V). Other nonelectronic applications such as electrostatic chucks, also require high ceramic resistivity. The typical application of AlN substrates microelectronics requires the resistivity of the ceramic to be greater than $10^{10}$ Ω-cm. Some applications may require even higher resistivity values, particularly in high voltage, high current applications.

at 1625° C. for 24 hrs. The results of this test showed that the resistivity of blanks did indeed increase significantly with this heat treatment accompanied with elimination of the initial very small concentration of calcium aluminate present in these samples. However, the resistance of ceramic layers that were trapped between dense metal layers in the co-fired metal ceramic laminate packages were not improved by this treatment.

In addition to sintering and further heat treating at 1625° C. (the sintering temperature), a series of low temperature dewetting treatments at 1500° C. of low resistivity samples was performed. As demonstrated in Table III, this treatment was very effective in increasing the resistivity of low resistivity blanks and metallized co-fired packages.

TABLE III

| Ex. No. | Initial Sinter/Dewetting °C./Hour (h) | Initial Resistance (Ω) | Dewetting Treatment (post sinter) °C./h | Resistance (Ω) | Final Microstructure |
|---|---|---|---|---|---|
| 90 | 1625/25 h | 11.5 × 10³ | 1500/10 h | 6.5 × 10⁹ | |
| 91 | 1625/24 h | 2.29 × 10³ | 1500/4 h | 233 | |
| 92 | 1625/24 h | 3.72 × 10³ | 1500/17 h | 2 × 10¹⁰ | dewetted |
| 93 | 1625/24 h | 3.3 × 10³ | 1625/24 h | 3.8 × 10³ | wetted |
| 94 | 1625/24 h | 8.1 × 10³ | 1800/4 h | 1.6 | wetted |
| 95 | 1625/24 h, 1800/4 h | 1.6 | 1500/10 h | 1.4 × 10¹⁰ | dewetted |
| 96 | 1625/24 h + 1500/17 h* | | | 1.77 10⁶ | wetted |
| 97 | 1625/24 h + 1200/0 h + 1500/10 h | | | 1.14 × 10¹⁵ | dewetted |
| 98 | 1625/24 h + 1500 17/h | 1.77 × 10⁶ | 1500/10 h | 2 × 10¹⁶ | dewetted |

*Did not cool between sintering and 1500° C. treatment.

Example C

A number of 9 layer co-fired metal-ceramic laminate, aluminum nitride packages were fabricated for testing according to the following procedures. The ceramic was prepared from a presintering mixture of aluminum nitride powder, 3 weight % yttria powder and 1 weight percent powdered calcia-alumina-boria glass (50/40/10 weight % ratio), which was tape cast, blanked, printed with metallization and laminated to produce multilayer laminated ceramic-metal packages. These packages were sintered at 1625° C. for 24 hrs following binder burnout, and resulted in dense ceramic with thermal conductivities near 150 W/m-K. These samples had a second phase composition made up of YAP, the quaternary compound, and a small amount of calcium aluminates. In addition to these co-fired packages, a number of unmetallized "blanks" were also fabricated. Initial electrical testing of these parts indicated that the sintered ceramic had a very low resistivity, particularly in regions between dense metallization in the co-fired package, but also in the bare ceramic blanks. The low resistivity parts also had a distinct green color.

An attempt to remedy this problem was to increase sinter time, on the theory that a residual calcium aluminate phase was responsible for the observed low resistivity and that this phase, being highly volatile, could easily be removed from the system. Low resistance dense parts were then re-sintered Based on this testing, it was observed that sintering at 1625° C., or sintering followed by further heat treating at the sintering temperature of 1625° C. to 1800° C. is not effective in increasing resistivity of co-fired metal-ceramic laminate packages, particularly between dense metallization layers. Heat treating cooled, dense, low resistivity parts at 1500° C. for a period of time was very effective in increasing resistivity of the co-fired metal-ceramic laminate packages. Upon heat treating a dense cofired metal-ceramic laminate package at 1500° C., a microstructural transition from a wetted second phase to a de-wetted second phase was observed. Simply following a sintering temperature hold (1625° C.) with a 1500° C. hold was not effective in producing high resistivity parts. If a low temperature (1200° C.) excursion was inserted between the 1625° C. sinter and 1500° C. hold, very high resistivity parts were produced. Wetted second phases (particularly calcium aluminates in addition to the Group II containing quaternary compound) were always observed to be present in low resistivity ceramic. De-wetted second phases were observed to be present in high resistivity ceramic. These samples also have very low dielectric loss at 1 KHz ($<10^{-2}$). We have therefore found that in order to produce a high resistivity aluminum ceramic having high density and high thermal conductivity, requires both a second phase composition defined within the desired areas of the compositional phase diagram, and a dewetted second phase morphology.

We propose, while not being limited in the scope of the present invention to the theory, that the de-wetting transition of the second phase occurs because the oxide liquid second phase "sees" an oxygen depleted aluminum nitride grain surface and thus minimizes energy by decreasing the oxide/nitride interfacial area.

This de-wetted microstructure can increase ceramic resistivity for two distinct reasons. The lack of continuity of the second phase will clearly decrease conductivity; and, the chemistry changes which drive the dewetting transition (as well as subsequent chemistry changes) may decrease the sample thickness. A summary of the results of the measurements is contained in Table IV.

TABLE IV

| EXAMPLE | SINTER/DEWETTING CYCLE °C./hour (h) | ELECTRICAL RESISTIVITY (Ω-cm @ 100 V) | XRD-SECOND PHASES (approximate percentages) | EDS SECOND PHASES | MICROSTRUCTURE: DIHEDRAL ANGLE |
|---|---|---|---|---|---|
| 100 | 1625/10 h | $2.7 \times 10^5$ | YAP (91%) T (9%) | YAP + T | 15.1 (± 6.0) |
| 101 | 1625/10 h 1500/10 h | $1.7 \times 10^{15}$ | YAP (86%) T (14%) | YAP + T | 91.3 (± 17.9) |
| 102 | 1625/10 h 1500/10 h 1625/4 h | $1.0 \times 10^6$ | YAP (92%) T (8%) | YAP + T | 14.3 (± 6.0) |
| 103 | 1625/10 h 1500/10 h 1625/4 h 1500/10 h | $>1.0 \times 10^{16}$ | YAP (86%) T (14%) | YAP + T | |
| 104 | 1625/10 h | $5.6 \times 10^4$ | YAP (84%) T (16%) | YAP + T | 12.8 (± 5.8) |
| 105 | 1625/10 h 1500/10 h | $4.3 \times 10^{13}$ | YAP (75%) T (25%) | YAP + T | 90.2 (± 11.8) |
| 106 | 1625/10 h 1500/10 h 1625/4 h | $8.0 \times 10^6$ | YAP (85%) T (11%) YAM (5%) | YAP + T + YAM | 7.3 (± 2.6) |
| 107 | 1625/10 h 1500/10 h 1625/4 h 1500/10 h | $>1.0 \times 10^{16}$ | YAP (89%) T (11%) | YAP + T | |

XRD = X-Ray Diffraction
EDS = Energy Dispersive X-Ray Spectroscopy
YAP = YAlO$_3$
YAM = Y$_4$Al$_2$O$_9$
T = YCaAl$_3$O$_7$ conductivity of the now isolated second phase regions. We have observed that the dielectric losses are very low in dewetted samples, which would indicate that the second phase particles are not only isolated, but also electrically insulating.

Two samples, described below, were studied to analyze this phenomenon.

Example D

A blank ceramic substrate was prepared from AlN powder, with sintering additives as described in Example C and 0.25% alumina, by sintered at 1625° C. for 10 hours following binder burnout. This sample was tested in examples 100–103.

Example E

A co-fired multilayer ceramic-metal laminate having 20 layers of ceramic and buried lines of tungsten metal was prepared, with the ceramic having the formulation and processing as set forth in example D. This sample was tested in examples 104–107.

A section from the center of each sample was extracted by diamond scribe/breaking and measured before and after heat treatment. Measurements were made of the electrical resistivity, the second phase composition by X-ray diffraction (XRD) confirmed by energy dispersive X-ray spectroscopy (EDS), and the quaternary second-phase dihedral angle from a scanning electron micrograph (SEM) microstructure. The electrical resistivity was measured by applying silver electrodes to opposite sides of the sample and then measuring the electrical resistance between these electrodes. The resistivity was then calculated from electrode size and sample thickness.

Figure 6:
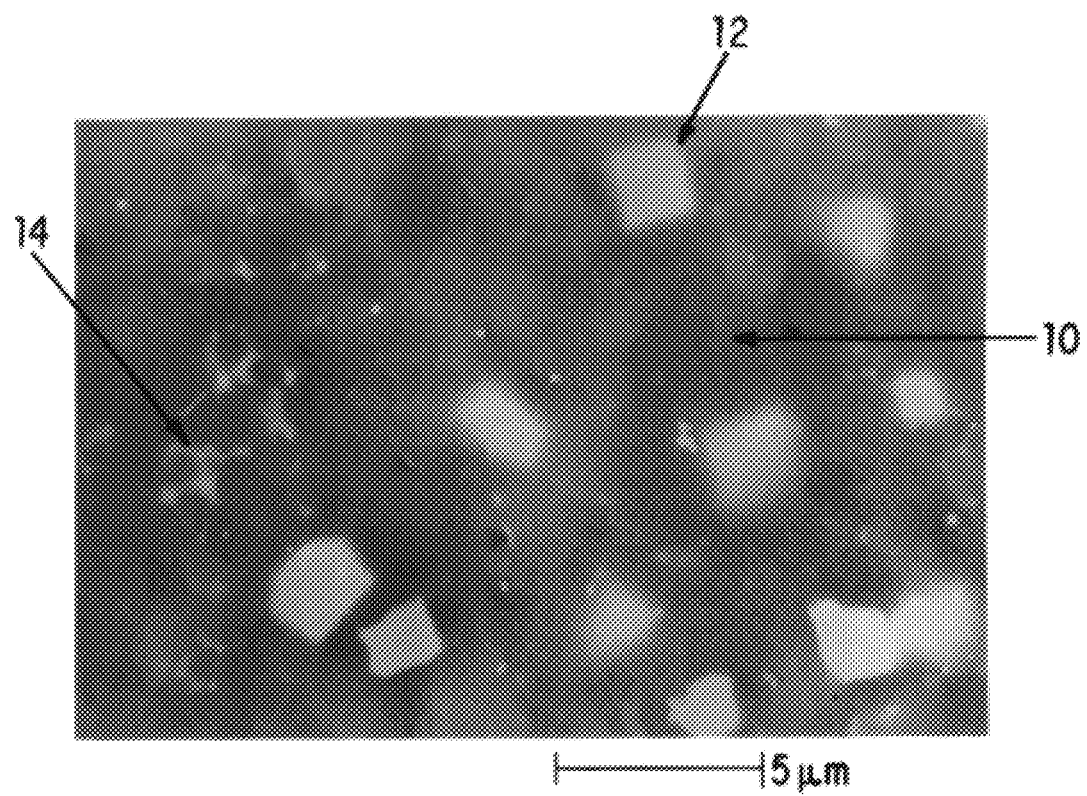
FIG. 6 is a SEM micrograph of the as-sintered microstructure of a blank ceramic substrate prepared without a dewetting treatment.

The as-sintered microstructure of the Example D blank with our dewetting treatment is shown in the SEM micrograph of FIG. 6. Present in this micrograph are three phases. These have been identified by XRD and confirmed with EDS as being AlN (light gray major phase), identified by the numeral 10 in FIG. 6, YAlO$_3$ or YAP (brightest secondary phase), identified by the numeral 12, and CaYAl$_3$O$_7$ quaternary-phase (less bright secondary phase), identified by the numeral 14. The observations made from this micrograph were that the quaternary-phase had a wetted morphology, the YAP phase was substantially de-wetted, and no phase other than AlN, YAP, and the quaternary was apparent in the microstructure.

Table IV shows that the resistivity of the blank sample, example 100, is $2.7 \times 10^5$ Ω-cm, an unacceptably low value. The co-fired laminate sample, example 104, exhibited exactly the same features, and a low resistivity $5.6 \times 10^4$ Ω-cm.

AlN is a known insulator with a band gap energy of 6.3 eV. Studies have shown there is no known impurity which will make this material conductive or semiconductive at room temperature. For macroscopic electrical conductivity across samples such as those observed, (thickness less than 2 mm) the conducting phase must be physically interconnected. Given the microstructural analysis summarized above, there are only two interconnected phases in this system—the AlN and the quaternary-phase. The YAP phase was highly dewetted and cannot be interconnected over such distances. Since the AlN is insulating it must be deduced that the conducting phase was quaternary-phase.

With the assumption that the quaternary second-phase was conductive and interconnected, there are two methods which would effect an increase in the macroscopic electrical resistivity of the sample containing this phase. The first is the removal of the phase from the system by evaporation in a reactive atmosphere. This approach would i) result in an inhomogeneous microstructure with large deposits of second phase near and on the surface and ii) will not work for ceramic regions located between dense metal planes in a package. This is a critical shortcoming, because most commercial electronic packages contain dense power and ground planes.

The second method is based on microstructural control of the secondary phases. We have discovered that by proper heat treatment one can control the morphology of the secondary phases in this system. This type of microstructural control in AlN for any sintering additives is heretofore unknown. The most appropriate measure of this control is the dihedral angle of the secondary phase with respect to the major AlN phase. The dihedral angle is a measure of the degree to which grain boundaries in the AlN ceramic are penetrated by secondary phases. This is also commonly referred to as "extent of wetting" of the secondary phases.

The dihedral angle is formed where a solid-solid grain boundary intersects the liquid, such as the microstructure of polycrystalline grain-to-grain contacts in the liquid phase, as exists during the sintering of polycrystalline aluminum nitride grains in contact with a sintering phase liquid. The "dihedral angle" is the angle formed between the lines formed from a point at the triple point (two grains and the liquid, or second, phase) that subtends the liquid or second phase, that is the lines touch the second phase. The dihedral angle is characteristic of the energy ratio between the grain boundaries and solid-liquid surfaces. If the solid-solid to liquid-solid energy ratio is high, the dihedral angle is small and the liquid will penetrate the grain boundaries of the solid. When the energy ratio is small, then the dihedral angle is high and there is little or no liquid penetration of the solid grain boundaries.

In one extreme, when the second phase fully "wets" the AlN, all the grain boundaries are entirely penetrated by the second phase leading to a microstructure with large narrow channels of second phase along grain boundaries. This microstructure has a fully interconnected second phase over the entire sample. In the other extreme, when the second phase has fully "de-wetted" the AlN, all the grain boundaries are devoid of second phase, the second phase forms into spheres and is entirely disconnected over any distance greater than approximately a grain diameter.

Figure 7A:
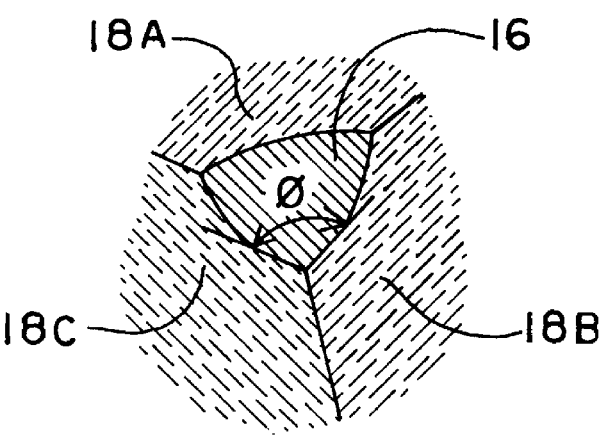
FIG. 7a is a schematic representation a portion of a microstructure (3 grains) which has been penetrated or "wetted" by the second phase to provide a dihedral angle.
Figure 7B:
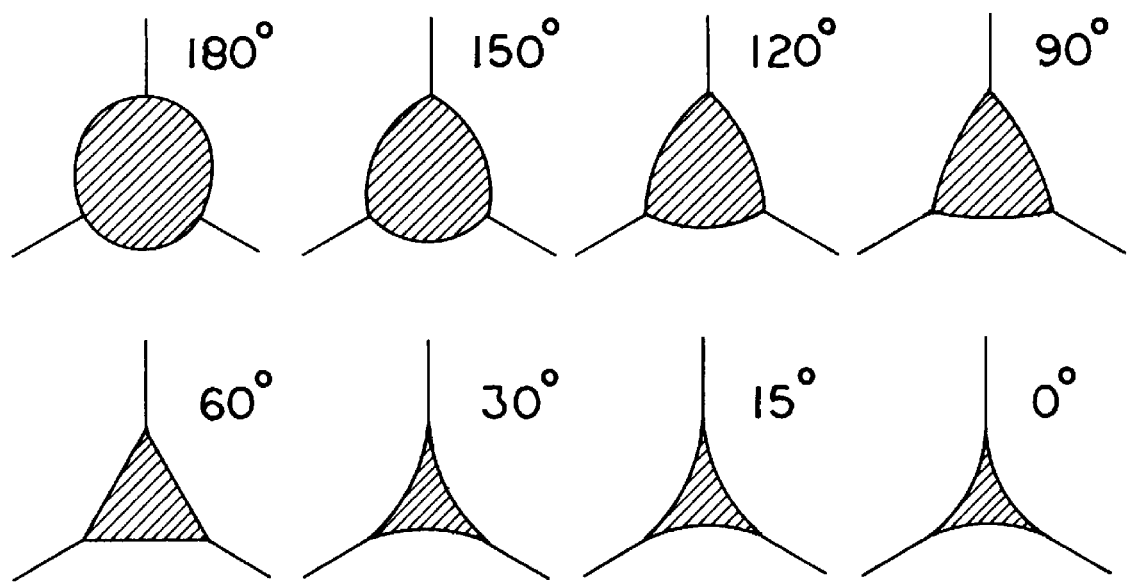
FIG. 7b is a schematic representation a selection of resulting second phase morphologies showing the effect of dihedral angle on shape of second phase formed at a line of intersection between three grains.

In the first extreme (fully wetting) the dihedral angle is defined as being 0° and in the second extreme (full dewetting) the dihedral angle is defined as being 180°. Dihedral angles between 0° and 180° can occur and will result in a continuous distribution of microstructure from fully wetted to fully de-wetted. FIG. 7a presents a schematic drawing of the definition of the dihedral angle (0). In FIG. 7a, a second phase 16 is shown as having penetrated the grain boundaries of three grains 18a, 18b, and 18c. FIG. 7b is schematic drawing of a selection of resulting second phase morphologies for different values of dihedral angle which shows the effect on the shape of the second phase. It is clear that the extent of interconnectivity of the secondary phase is well characterized by the dihedral angle.

We have discovered that with proper dewetting heat treatment, the dihedral angle of some critical secondary phases in AlN, namely calcium aluminates and calcium containing quaternary compounds, can be controlled—i.e. the interconnectivity of the potentially conductive second-phase can be controlled. If this phase is disconnected from the AlN grains, it cannot lead to substantial electrical conductivity over a macroscopic distance.

Table IV demonstrates the control of the dihedral angle of the quaternary second-phase and the resultant electrical resistivity of the sample utilizing the appropriate heat treatment. In examples 102 and 106, heat treatment below the sintering temperature caused the second-phase to dewet from the AlN, resulting in an increase in both dihedral angle and resistivity. Further treatment at sintering temperatures, in examples 102 and 105 resulted in a decrease in both dihedral angle and resistivity. The dihedral angle was increased and high resistivity restored by further treatment of the samples at an elevated temperature below the sintering temperature.

It is important to note that the second phase composition in these samples were not changing to any significant degree. Structurally, all that changed was the dihedral angle of the quaternary second-phase.

Figure 8:
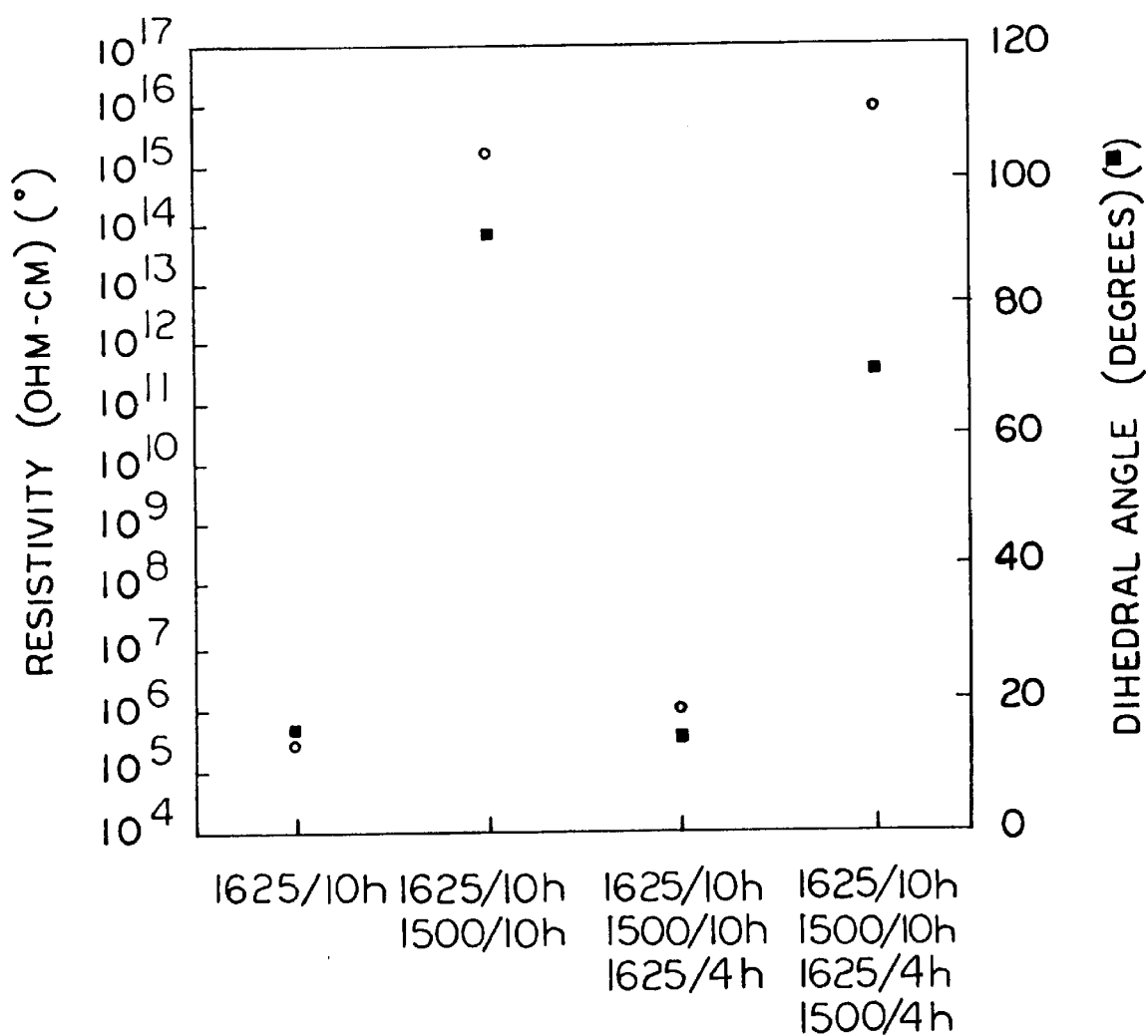
FIG. 8 is a graphical representation of electrical resistivity and dihedral angle plotted versus heat treatment of samples prepared according to the present invention.

FIG. 8 presents a plot of electrical resistivity and dihedral angle of the quaternary second-phase as a function of heat treatment for the same sample. A very large change in electrical resistivity, greater than 10 orders of magnitude, accompanied a corresponding change in the dihedral angle of the quaternary second-phase. In the as-sintered condition (1625° C./10h) the sample is conductive with a low quaternary second-phase dihedral angle (wetting). A heat treatment of the same sample at 1500° C./10h gives a material with a very high resistivity (non-conductive) and a large quaternary second-phase dihedral angle (dewetting). A further "sintering" heat treatment of the same sample at 1625° C./4h re-wets the quaternary second-phase and the resistivity drops again to a low value similar to that in the as-sintered condition. An additional dewetting heat treatment at 1500° C./10h once again dewets the quaternary second-phase with a concomitant increase in the electrical resistivity. Such reversibility of the electrical resistivity linked to the dihedral angle of the quaternary second-phase establishes a direct correspondence between these two properties.

The results above demonstrate the drastic effect that the microstructure of sintered AlN, having a calcia-containing second-phase or calcium-containing quaternary second-phase, has on electrical resistivity, a key property for electronic packaging applications. The effect of second phase microstructure can also be observed in a number of other important electrical properties such as the dielectric properties.

Figure 9:
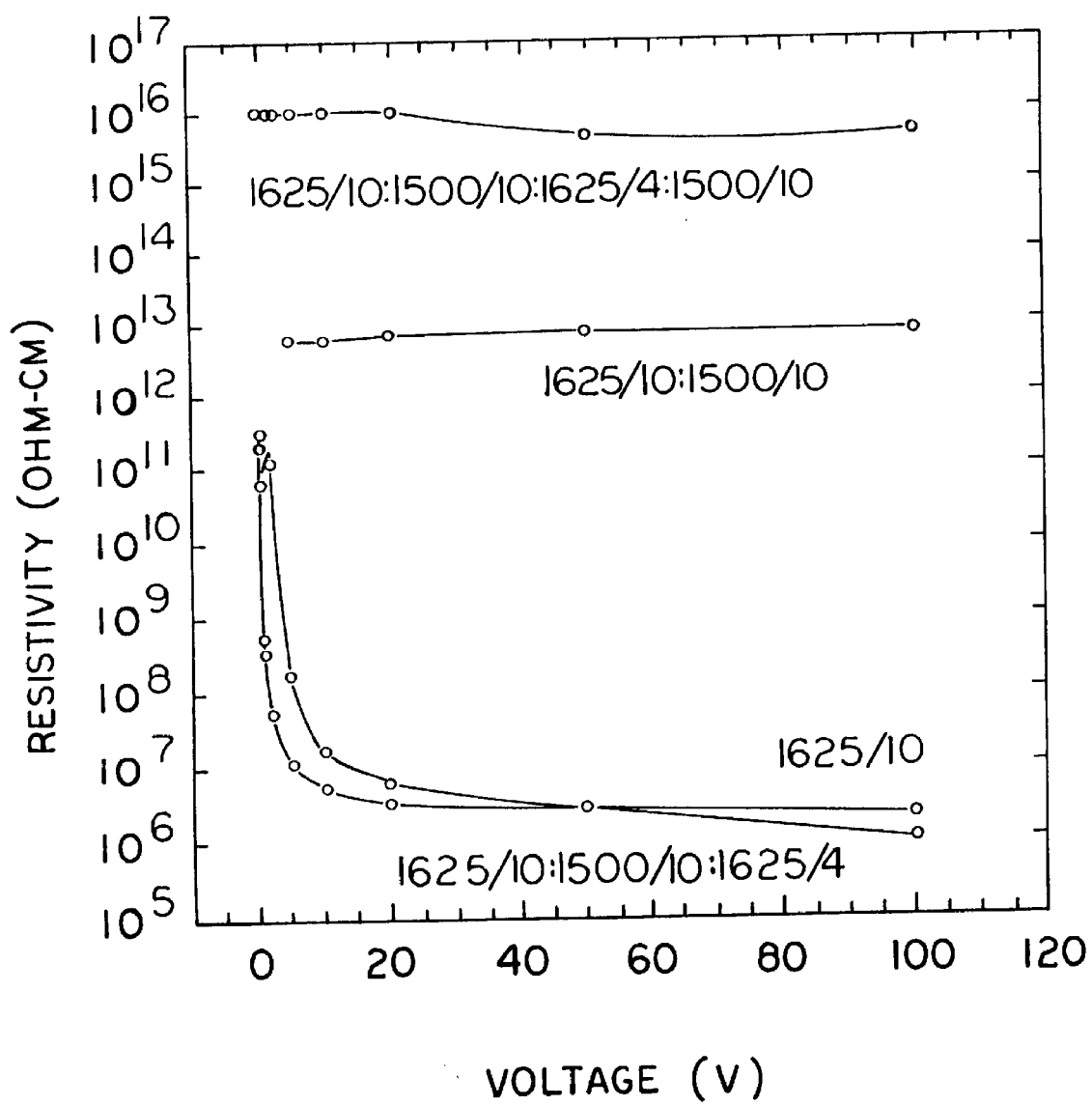
FIG. 9 is a graphical representation of electrical resistivity plotted versus voltage for sample having the dewetting heat treatments as shown in FIG. 8.
Figure 10:
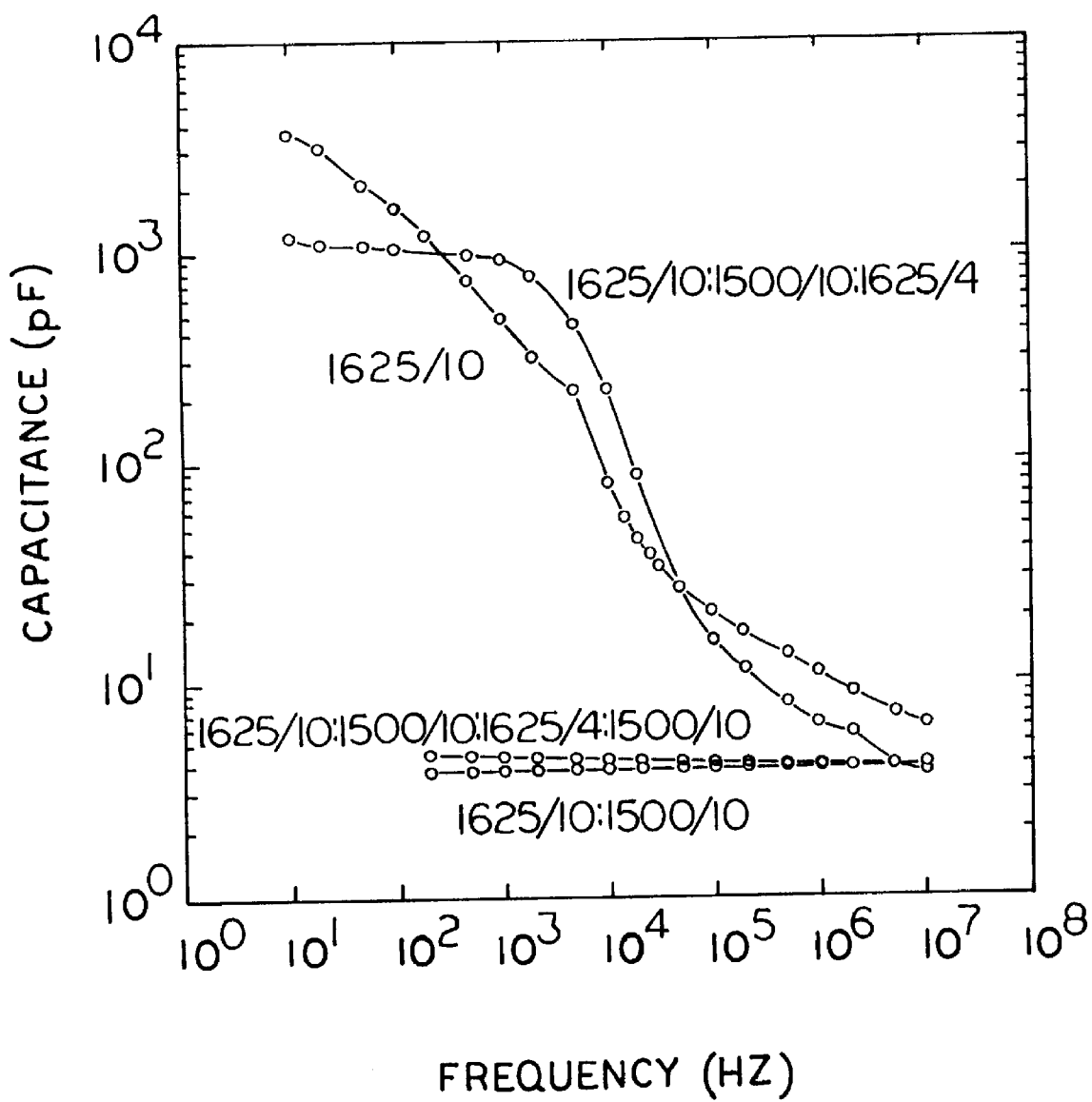
FIG. 10 is a graphical representation of capacitance (pF) versus frequency (Hz) of the samples having the dewetting heat treatments as shown in FIG. 8.
Figure 11:
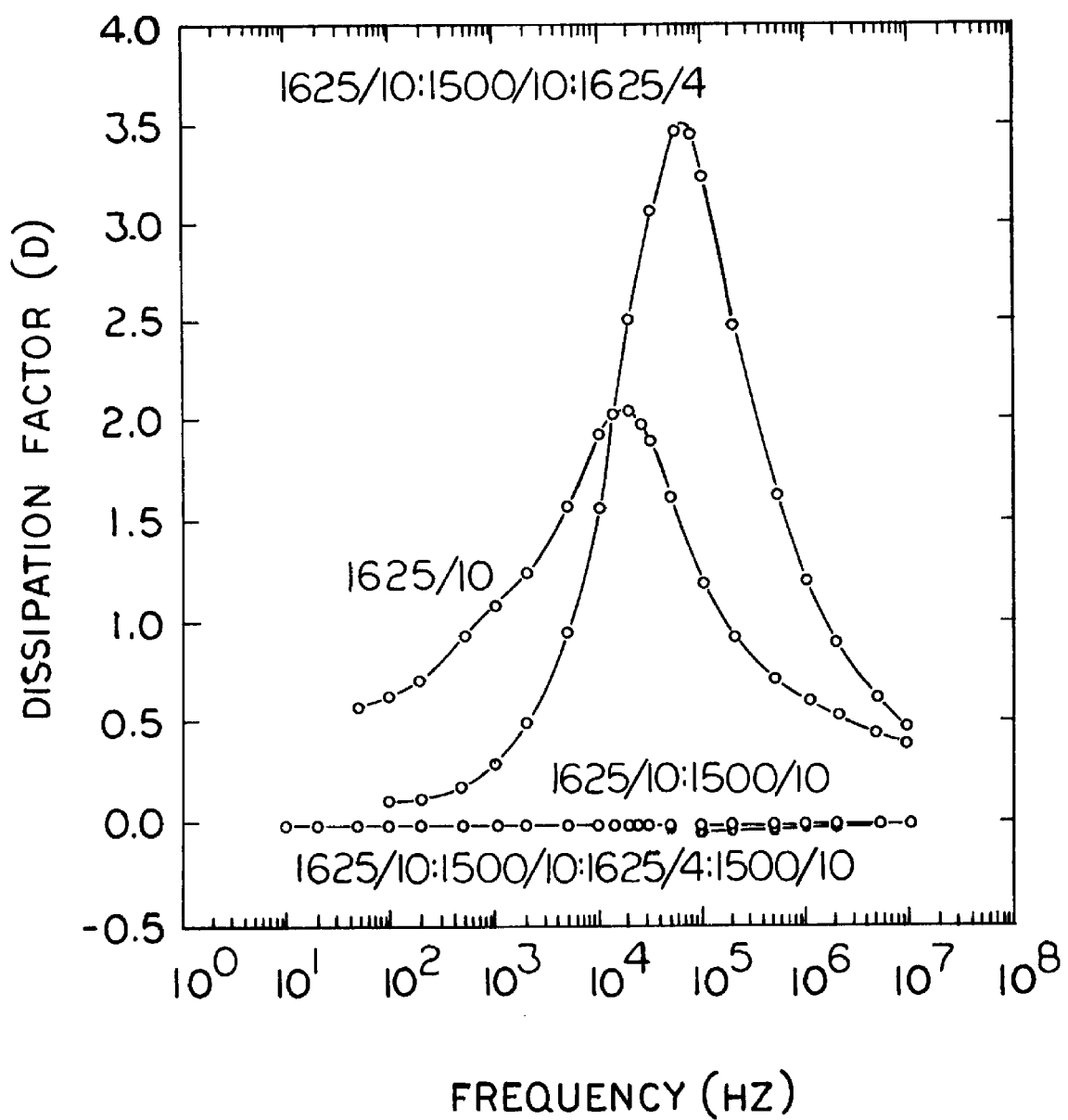
FIG. 11 is a graphical representation of dissipation factor (D) versus frequency (Hz) of the samples having the dewetting heat treatments as shown in FIG. 8.

Measurements of the electrical resistivity as a function of voltage and dewetting heat treatment, and therefore dihedral angle, is presented in FIG. 9. It is readily apparent that AlN ceramic resistivity is highly dependent on the AlN—second phase microstructure, as has been demonstrated above. FIG. 10 presents the capacitance (in pF), and FIG. 11 presents the dissipation factor (D) of the examples 100–103 as a function of frequency and heat treatment (dihedral angle). Once again it is clear that these other key electrical properties are controlled by the second-phase wetting angle. This is particularly exemplified in the dissipation factor data, where a large peak is present when the second-phase is wetted and then totally disappears when the second-phase is dewetted. This data is a reliable "signature" of state of the microstructure of the sample. This, in combination with the resistivity results are a clear demonstration that the calcium-containing second-phase compound wetting angle in AlN ceramics controls key electrical properties.

Figure 7C:
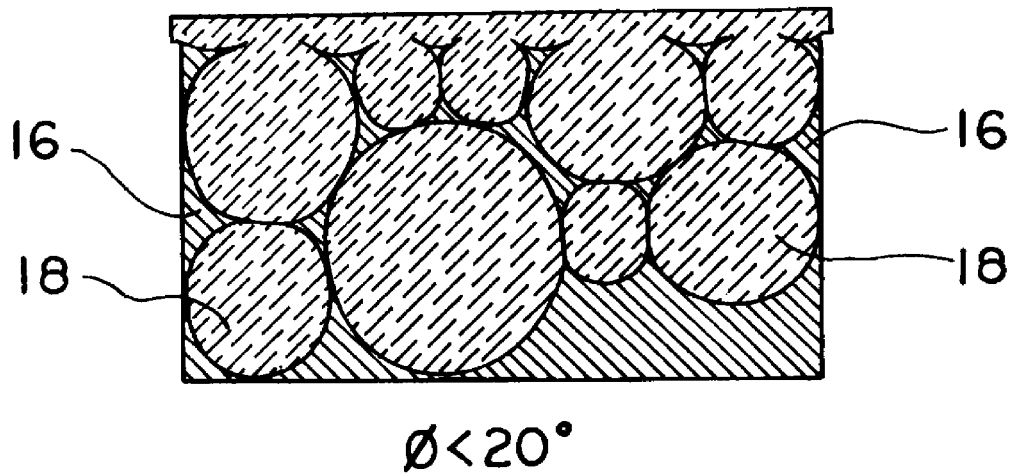
FIG. 7c is a schematic representation of a cross-sectional view of a wetted ceramic microstructure having a dihedral angle of about 20° or less.
Figure 7D:
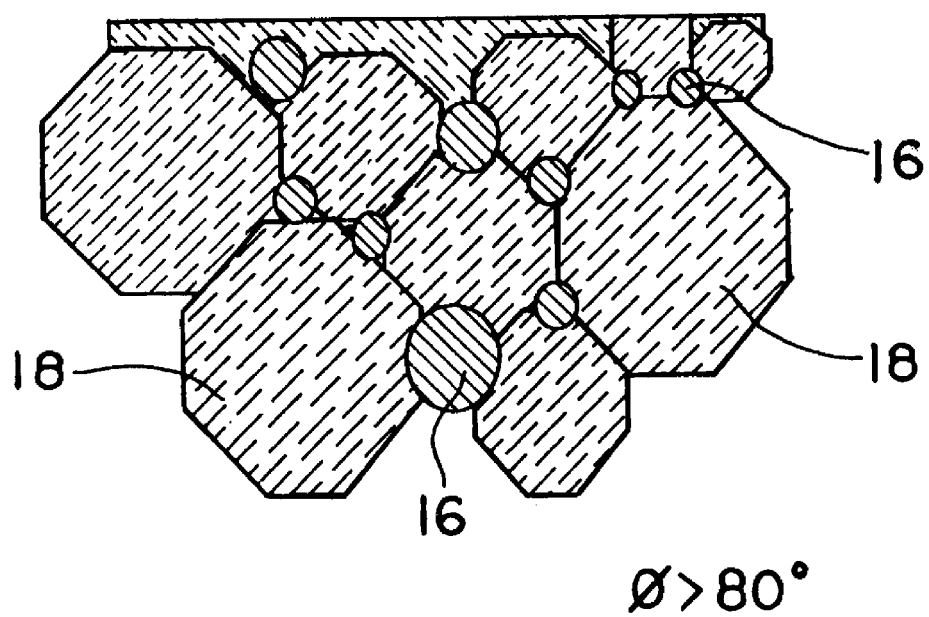
FIG. 7d is a schematic representation of a cross-sectional view of a dewetted ceramic microstructure having a dihedral angle of about 80° or more.

In the present invention, it is recognized that although the potentially conductive calcium aluminate and quaternary second phase species (defined within the areas I, II, III, V, VI, and VII of the compositional phase diagram) may be volatilized by high temperature treatment for an effective period of time for removal from a monolithic aluminum nitride ceramic substrate, in a co-fired metal-ceramic laminate structure, dense metal planes sinter very early in the sintering process, and the calcium aluminate species cannot vaporize through them. The present invention provides for the restoration of high resistivity of the ceramic having a potentially conductive second phase by causing the second phase to de-wet from the ceramic aluminum nitride grains, that is, to transition from a wetted microstructure having a dihedral angle insufficient to provide an electrical resistivity suitable for electronic packaging applications, i.e., of about 20° or less as shown schematically in FIG. 7c, to a de-wetted microstructure having a dihedral angle sufficient to provide an electrical resistivity of at least about $10^8$ Ω-cm or more, which is believed to be an angle of about 30° or more, and preferably about 80° or more, as shown schematically in FIG. 7d.

A highly resistive, low temperature sintered aluminum nitride ceramic body has a microstructure containing aluminum nitride grains and a calcium-containing second phase, said second phase being at least partially dewetted and in contact with the aluminum nitride grains at a dihedral angle sufficient to provide a resistivity of about $10^8$ Ω-cm or more. Such a dihedral angle is preferably greater than about 30° and even more preferably greater than or equal to about 80°. Most preferably, in a highly resistive, low temperature sintered aluminum nitride ceramic body according to a preferred embodiment of the invention, the second phase has a substantially dewetted microstructure.

According to the present invention, a resistive, sintered aluminum nitride ceramic body is prepared by a) sintering, at a sintering temperature between 1500° C. and 1800° C., a mixture of aluminum nitride powder with a sintering aid package sufficient to form a sintered body having a second phase containing at least one second phase composition defined by the region including and within lines D-E-F-H-B in FIG. 4; b) cooling said sintered body to at least below 1500° C., preferably to at least about 1200° C. or below; and c) heat treating said sintered body at a temperature of at least 1500° C., but below the sintering temperature for a period of time sufficient to cause said second phase to at least partially dewet from the aluminum nitride so as to contact the aluminum nitride at a dihedral angle sufficient to provide a resistivity of $10^8$ Ω-cm, and preferably one of at least 30°. Preferably, the sintered body is cooled to ambient temperature prior to heat treating, although it is possible to achieve the de-wetting effect by a low temperature (1500° C.) dewetting treatment hold after sintering and cooling (to, for example, 1200° C.) in a single cycle.

In a preferred embodiment, a resistive, sintered aluminum nitride ceramic body is prepared by a) forming a mixture by mixing aluminum nitride powder with a sintering aid package sufficient to form a sintering phase liquid at sintering temperature having a sintering composition defined by triangle I of FIG. 4; b) sintering said mixture at a temperature between 1500° C. and 1800° C. to form a sintered body having a second phase containing at least one second phase composition defined by the region including and within lines D-E-F-H-B in FIG. 4; c) cooling said sintered body to at least below 1500° C., preferably to at least about 1200° C. or below; and, d) heat treating said sintered body at a temperature of at least 1500° C. but below the sintering temperature for a period of time sufficient to cause said second phase to dewet from the aluminum nitride and form a dihedral angle sufficient to provide a resistivity of $10^8$ Ω-cm, and preferably one of at least 30° with respect to the aluminum nitride.

A resistive, sintered aluminum nitride ceramic body is therefore obtained having a density of at least about 90%, preferably about 95% or greater, of theoretical, and a thermal conductivity of at least about 100 W/m-K, wherein said body has a microstructure containing aluminum nitride grains and a calcium-containing second phase, said second phase being in contact with the aluminum nitride grains at a dihedral angle sufficient to provide a resistivity of $10^8$ Ω-cm, and preferably one of greater than about 30° and comprising at least one composition defined by the region including and within lines D-E-F-H-B in FIG. 4. Preferably, the composition comprises a quaternary or pseudo-quaternary compound containing Ca, Y, Al, and O.

As shown above, the above compositional, physical and electronic characteristics are also observed in co-fired multilayer AlN sintered bodies in accordance with the present invention, having multiple alternating layers of metal and ceramic. The co-fired bodies exhibit dimensional control without significant geometric distortion. A resistive, sintered aluminum nitride ceramic body is thus provided, comprising a cofired multilayer laminate containing at least one aluminum nitride ceramic layer between at least two dense metal layers, wherein said ceramic layer has a microstructure containing aluminum nitride grains and a calcium-containing second phase, said second phase being in contact with the aluminum nitride grains at a dihedral angle sufficient to provide a resistivity of $10^8$ Ω-cm. Preferably, the dihedral angle is greater than about 30°, and even more preferably, is greater than or equal to about 80°. Preferably, the second phase contains at least one composition defined by the region including and within lines D-E-F-H-B in FIG. 4. Most preferably, the second phase has a substantially dewetted microstructure.

Example F

Figure 12:
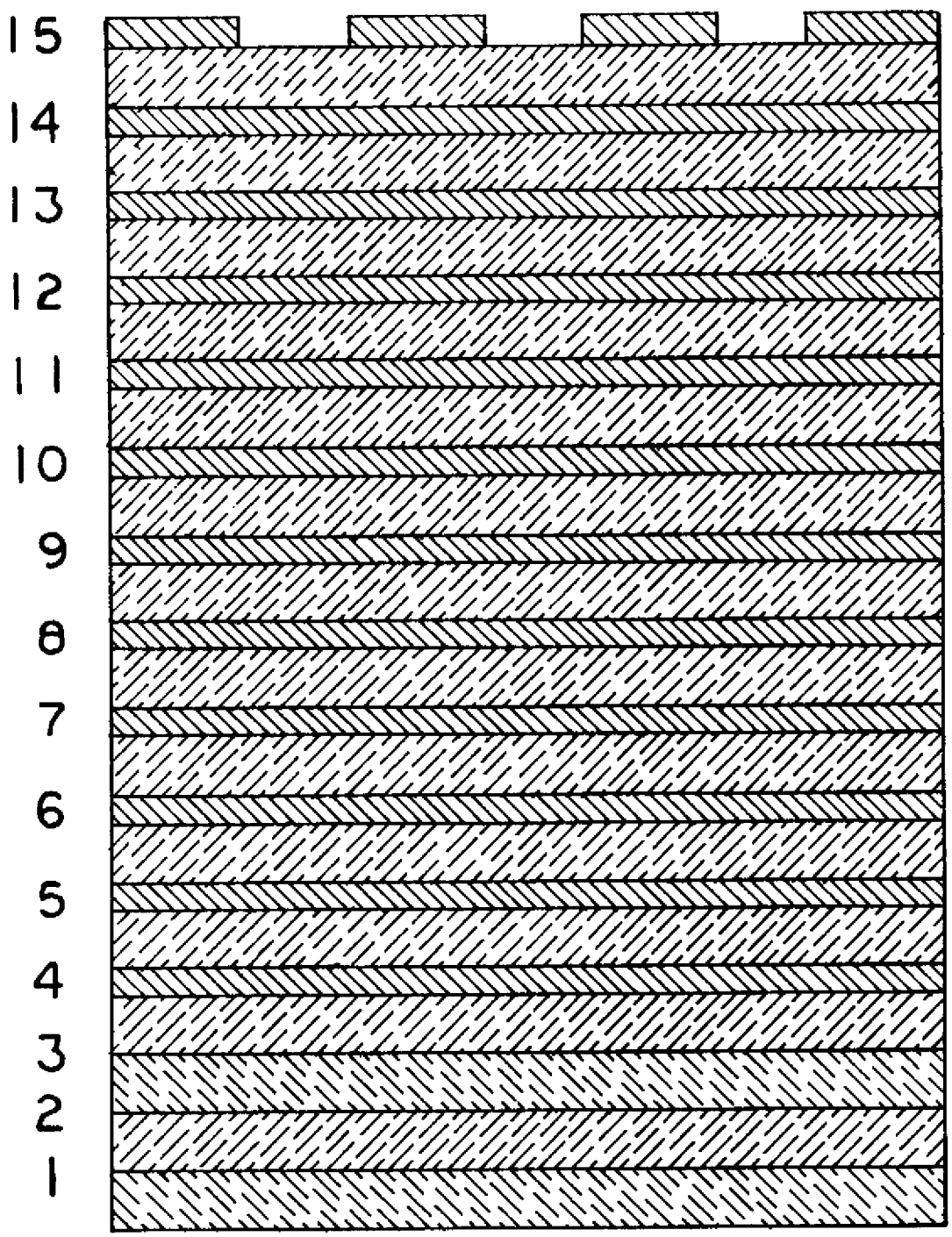
FIG. 12 is a schematic cross sectional view of an AlN ceramic-tungsten metal laminate electronic substrate prepared according to the present invention.

Aluminum nitride ceramic—tungsten metal laminate electronic substrates were prepared according to the generic configuration shown in FIG. 12, comprising fifteen ceramic layers and nine metal layers as described in Table V.

TABLE V

| Layer | Layer Characteristic |
|-------|---------------------|
| 1 | Blank |
| 2 | Blank |
| 3 | Blank |
| 4 | Vias + Redistribution |
| 5 | Vias + Redistribution |
| 6 | Vias + Metal Plane (Power) |
| 7 | Vias + Metal Plane (Ground) |
| 8 | Vias |
| 9 | Vias + Redistribution |
| 10 | Vias + Redistribution |
| 11 | Vias + Metal Plane (Ground) |
| 12 | Vias + Redistribution |
| 13 | Vias + Redistribution |
| 14 | Vias |
| 15 | I/O Pads |

The ceramic was prepared from a presintering mixture of aluminum nitride powder, 3 weight % yttria powder and 1 weight percent powered calia-alumina-boria glass (50/40/10 weight % ratio), hich waas tape cast, blanked, printed with metallization and laminated to produce multilayer, laminated ceramic—metal parts.

After binder burnout at 1300° C. for 4 hours, the parts were processed as set forth in Table VI below. The final sintered parts connected three-dimensional interconnected tungsten metal lines called "nets". The most important of these connect two dense metal layers (6 and 7) which prevent second phase evolution during the sintering cycle. The resistance of the "net" area of the ceramic was measured, and the second phase present was identifired as $Ca_{12}Al_7O_x$ by X-ray diffraction. In some examples, the dihedral angle of the second phase to the polycrystalline grains was measured. These are reported in Table VI below.

microstructure, having a dihedral angle less than 30°, with interconnected areas of $Ca_{12}Al_7O_x$ throughout the material.

It is thus demonstrated that the microstructure of the second phase material can be dramatically affected by post sintering heat treatments, and that heat treatments below the sintering temperature can cause dewetting of the second phase from the aluminum nitride grains. The dewetting of the microstructure is accompanied by a dramatic rise in the resistivity of ceramic having second phase compositions in areas I, II, III, V, VI and VII of the phase diagram of FIG. 4, especially where that second phase includes calcium

TABLE VI

| Example | Sintering/Dewetting Cycle | Resistance of Metal Net ($\Omega$) | Second Phase Composition | Dihedral Angle (degrees) |
|---|---|---|---|---|
| 110 | 1625° C./24 h<br>1200° C./0 h<br>1450° C./4 h | $1.0 \times 10^{13}$ | T, YAP | |
| 111 | 1625° C./24 h<br>1500° C./17 h | $1.77 \times 10^6$ | T, YAG, $C_{12}A_7$, YAP | 39 |
| 112 | 1500° C./10 h treatment of Example 111 | $2.0 \times 10^{14}$ | T YAG, $C_{12}A_7$, YAP | 80 |
| 113 | 1625° C./10 h treatment of Example 112 | $8.5 \times 10^3$ | T, YAG, $C_{12}A_7$, YAP | 27 |
| 114 | 1500° C./10 h treatment of Example 113 | $1.0 \times 10^{12}$ | T, YAG, $C_{12}A_7$, YAP | 81 |
| 115 | 1625° C./24th | $3.72 \times 10^3$ | T, YAG, $C_{12}A_7$, YAP | |
| 116 | 1625° C./24th | $8.1 \times 10^3$ | YAG, $C_{12}A_7$, T | |
| 117 | 1800° C./4 h | 1.6 | YAG, $C_{12}A_7$ | |

$C_{12}A_7 = Ca_{12}Al_{14}O_x$
T = $YCaAl_3O_7$
YAG = $T_3Al_5O_{12}$
YAP = $YAlO_3$

In example 110, a highly resistive multilayer ceramic-metal laminate was subjected to a single step sintering cycle, including a cooling to 1200° C. prior to a dewetting heat treatment step below th e sintering temperature. The net was highly resistive.

In example 111, there was a 1500° C. hold after sintering. Resistivity was moderate, as the dihedral angle was measured at 39°. In example 112, parts from example 111 were subjected to a 1500° C. dewetting treatment after cooling. Resistivity was increased, to over $10^{14}$ $\Omega$-cm, as was the dihedral angle, to 80°.

The connectivity of the second phase as shown by the dihedral angle is controlled by the heat treatments without a significant change in the second phase composition. The microstructure was shown to be reversible by the dewetting heat treatment in example 113 of parts from example 112 at the sintering temperature. The second phase again became wetting, and the resistivity dropped dramatically to below $10^4$ $\Omega$-cm as the dihedral angle decreased to 27°. The second phase was again dewetted by the heat treatment of parts from example 113 in example 114, at a temperature below the sintering temperature. The resistivity recovered to $10^{12}$ $\Omega$-cm, and the dihedral angle increased to 81°.

Figure 13:
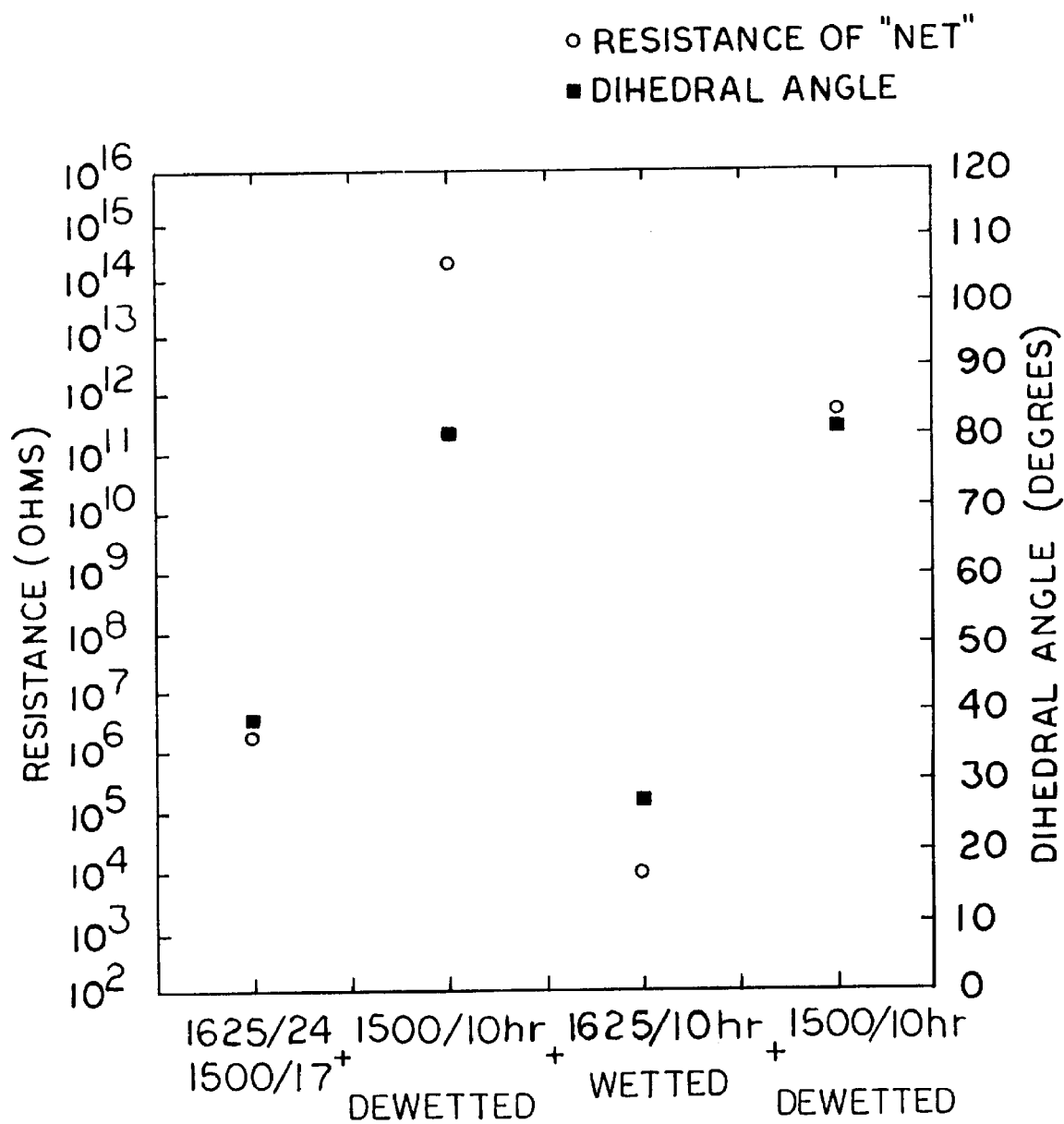
FIG. 13 is a graphical representation of electrical resistivity and dihedral angle plotted versus heat treatment of samples prepared according to the present invention.

The resistivity and dihedral angle are charted for these examples in FIG. 13, to show the relationship between resistivity of the ceramic-metal net and the dihedral angle (microstructure) of the second phase.

In comparative examples 115, 116 and 117, the parts were sintered after the binder burnout step, without a subsequent heat treatment. The resistivity of the net was very low for these parts. Microstructural analysis and elemental mapping by X-ray spectroscopy showed a highly wetted aluminate and calcium containing quaternary second phase species. Preferably, such a ceramic has a resistivity of at least about $10^8$ $\Omega$-cm.

We have found that the heat treatment of the present invention is unexpectedly effective in refining the microstructure of the second phase and changing electrical resistivity, even at temperatures which are below those at which second phase liquid was thought to exist, and below temperatures at which sintering occurs.

The second phase present in the sintered AlN body can be maintained within the phase diagram compositional region desired, and is dependent upon the Group IIa component-:Group IIIa-rare earth component ratio and the alumina-:Group IIa component ratio (in a preferred embodiment, the Ca:Y ratio and the alumina:Ca ratio), as well as the sintering temperature and time (control of sintering conditions being assumed).

Thus, the objects of the invention are accomplished by the present invention, which is not limited to the specific embodiments described above, but which includes variations, modifications and equivalent embodiments defined by the following claims.

We claim:

1. A resistive, sintered aluminum nitride ceramic body having a density of at least about 90% of theoretical, and a thermal conductivity of at least about 100 W/m-K, wherein said body has a microstructure containing aluminum nitride grains and a second phase having at least one calcium containing component, said at least one calcium containing component of said second phase being in contact with the aluminum nitride grains at a dihedral angle sufficient to provide a resistivity of at least about $10^8$ $\Omega$-cm and comprising at least one composition defined by the region including and within lines D-E-F-H-B in FIG. 4.

2. The resistive, sintered aluminum nitride ceramic body of claim 1, wherein said calcium containing component of said second phase is in contact with the aluminum nitride grains at a dihedral angle greater than 30°.

3. The resistive, sintered aluminum nitride ceramic body of claim 1, wherein said calcium containing component of said second phase is in contact with the aluminum nitride grains at a dihedral angle greater than or equal to about 80°.

4. The resistive, sintered aluminum nitride ceramic body of claim 1, wherein the calcium containing component of said second phase is substantially dewetted.

5. A resistive, sintered aluminum nitride ceramic body having a density of at least about 90% of theoretical, and a thermal conductivity of at least about 100 W/m-K, wherein said body has a microstructure containing aluminum nitride grains and a second phase having at least one calcium-containing component, said calcium containing component of said second phase being in contact with the aluminum nitride grains at a dihedral angle sufficient to provide a resistivity of at least about $10^8$ Ω-cm and comprising at least one composition defined by the region including and within lines B-A-$C_1$ in FIG. 4.

6. The resistive, sintered aluminum nitride ceramic body of claim 5, wherein said calcium containing component of said second phase is in contact with the aluminum nitride grains at a dihedral angle greater than 30°.

7. The resistive, sintered aluminum nitride ceramic body of claim 5, wherein said calcium containing component of said second phase is in contact with the aluminum nitride grains at a dihedral angle greater than or equal to about 80°.

8. The resistive, sintered aluminum nitride ceramic body of claim 5, wherein the calcium containing component of said second phase is substantially dewetted.

9. The resistive, sintered aluminum nitride ceramic body of claim 5, wherein said calcium containing component of said second phase includes $CaYAl_3O_7$.

10. A resistive, sintered aluminum nitride ceramic body having a density of at least about 90% of theoretical, and a thermal conductivity of at least about 100 W/m-K, wherein said body has a microstructure containing aluminum nitride grains and a second phase, said second phase comprising at least one of $CaYAl_3O_7$ and $CaYAlO_4$ and at least one yttrium aluminate, said at least one of $CaYAl_3O_7$ and $CaYAlO_4$ being in contact with the aluminum nitride grains at a dihedral angle sufficient to provide a resistivity of at least about $10^8$ Ω-cm.

11. The resistive, sintered aluminum nitride ceramic body of claim 10 wherein said yttrium aluminate is a pseudo-quaternary compound comprising Ca, Y, Al, and O.

12. The resistive, sintered aluminum nitride ceramic body of claim 10 wherein said yttrium aluminate is calcium substituted $YAlO_3$.

13. The resistive, sintered aluminum nitride ceramic body of claim 10 wherein said yttrium aluminate is YAG, calcium substituted $YAlO_3$ or mixtures thereof.

14. The resistive, sintered aluminum nitride ceramic body of claim 10, wherein said at least one of $CaYAl_3O_7$ and $CaYAlO_4$ of said second phase is in contact with the aluminum nitride grains at a dihedral angle greater than 30°.

15. The resistive, sintered aluminum nitride ceramic body of claim 10, wherein said at least one of $CaYAl_3O_7$ and $CaYAlO_4$ of said second phase is in contact with the aluminum nitride grains at a dihedral angle greater than or equal to about 80°.

16. The resistive, sintered aluminum nitride ceramic body of claim 10, wherein the at least one of $CaYAl_3O_7$ and $CaYAlO_4$ of said second phase is substantially dewetted.

17. A process for preparing a resistive, sintered aluminum nitride ceramic body comprising:
    a) sintering, at a sintering temperature between 1550° C. and 1800° C., a mixture of aluminum nitride powder with a sintering aid package sufficient to form a sintered body having a second phase having at least one calcium containing component, wherein at least one second phase composition is defined by the region including and within lines D-E-F-H-B in FIG. 4;
    b) cooling said sintered body to at least below 1500° C.; and
    c) heat treating said sintered body at a temperature of at least 1300° C. but below the sintering temperature for a period of time sufficient to cause said calcium containing component of said second phase to at least partially dewet from the aluminum nitride so as to contact the aluminum nitride at a dihedral angle sufficient to provide a resistivity of at least about $10^8$ Ω-cm.

18. The process of claim 17 wherein the sintered body is cooled to below 1200° C.

19. The process of claim 17 wherein the sintered body is cooled to ambient temperature.

20. A process for preparing a resistive, sintered aluminum nitride ceramic body comprising:
    a) sintering, at a sintering temperature between 1550° C. and 1800° C., a mixture of aluminum nitride powder with a sintering aid package sufficient to form a sintered body having a second phase having at least one calcium containing component, wherein at least one second phase composition is defined by the region including and within lines B-A-$C_1$ in FIG. 4 other than point B;
    b) cooling said sintered body to at least below 1500° C.; and
    c) heat treating said sintered body at a temperature of at least 1300° C. but below the sintering temperature for a period of time sufficient to cause said calcium containing component of said second phase to at least partially dewet from the aluminum nitride so as to contact the aluminum nitride at a dihedral angle sufficient to provide a resistivity of at least about $10^8$ Ω-cm.

21. The process of claim 20, wherein said calcium containing component of said second phase includes $CaYAl_3O_7$.

22. The process of claim 20 wherein the sintered body is cooled to below 1200° C.

23. The process of claim 20 wherein the sintered body is cooled to ambient temperature.

24. A process for preparing a resistive, sintered aluminum nitride ceramic body comprising:
    a) sintering, at a sintering temperature between 1550° C. and 1800° C., a mixture of aluminum nitride powder with a sintering aid package sufficient to form a sintered body having a second phase comprising at least one of $CaYAl_3O_7$ and $CaYAlO_4$ and at least one yttrium aluminate,
    b) cooling said sintered body to at least below 1500° C.; and
    c) heat treating said sintered body at a temperature of at least 1300° C. but below the sintering temperature for a period of time sufficient to cause said at least one of $CaYAl_3O_7$ and $CaYAlO_4$ of said second phase to at least partially dewet from the aluminum nitride so as to contact the aluminum nitride at a dihedral angle sufficient to provide a resistivity of at least about $10^8$ Ω-cm.

25. The process of claim 24 wherein said yttrium aluminate is calcium substituted $YAlO_3$.

26. The process of claim 24 wherein said yttrium aluminate is YAG, calcium substituted $YAlO_3$ or mixtures thereof.

27. The process of claim 24 wherein the sintered body is cooled to below 1200° C.

28. The process of claim 24 wherein the sintered body is cooled to ambient temperature.

29. A resistive, sintered aluminum nitride ceramic body comprising a cofired multilayer laminate containing at least one aluminum nitride ceramic layer between at least two dense metal layers, wherein said ceramic layer has a microstructure containing aluminum nitride grains and a second phase having at least one calcium containing component, said calcium containing component of said second phase being in contact with the aluminum nitride grains at a dihedral angle sufficient to provide a resistivity of at least about $10^8$ Ω-cm and comprising at least one composition defined by the region including and within lines D-E-F-H-B in FIG. 4.

30. The resistive, sintered aluminum nitride ceramic body of claim 29, wherein said dihedral angle is greater than 30°.

31. The resistive, sintered aluminum nitride ceramic body of claim 29, wherein said dihedral angle is greater than or equal to about 80°.

32. The resistive, sintered aluminum nitride ceramic body of claim 29, wherein the calcium containing component of said second phase is substantially dewetted.

33. A resistive, sintered aluminum nitride ceramic body comprising a cofired multilayer laminate containing at least one aluminum nitride ceramic layer between at least two dense metal layers, wherein said ceramic layer has a microstructure containing aluminum nitride grains and a second phase having at least one calcium containing component, said calcium containing component of said second phase being in contact with the aluminum nitride grains at a dihedral angle sufficient to provide a resistivity of at least about $10^8$ Ω-cm and comprising at least one composition defined by the region including and within lines B-A-$C_1$ in FIG. 4, other than point B.

34. The resistive, sintered aluminum nitride ceramic body of claim 33, wherein said dihedral angle is greater than 30°.

35. The resistive, sintered aluminum nitride ceramic body of claim 33, wherein said dihedral angle is greater than or equal to about 80°.

36. The resistive, sintered aluminum nitride ceramic body of claim 33, wherein the calcium containing component of said second phase is substantially dewetted.

37. The resistive, sintered aluminum nitride ceramic body of claim 33, wherein the calcium containing component is $CaYAl_3O_7$ and is substantially dewetted.

38. A resistive, sintered aluminum nitride ceramic body comprising a cofired multilayer laminate containing at least one aluminum nitride ceramic layer between at least two dense metal layers, wherein said ceramic layer has a microstructure containing aluminum nitride grains and a second phase comprising at least one of $CaYAl_3O_7$ and $CaYAlO_4$ and at least one yttrium aluminate, said at least one of $CaYAl_3O_7$ and $CaYAlO_4$ being in contact with the aluminum nitride grains at a dihedral angle sufficient to provide a resistivity of at least about $10^8$ Ω-cm.

39. The resistive, sintered aluminum nitride ceramic body of claim 38 wherein said yttrium aluminate is calcium substituted $YAlO_3$.

40. The resistive, sintered aluminum nitride ceramic body of claim 38 wherein said yttrium aluminate is YAG, and calcium substituted $YAlO_3$ or mixtured thereof.

41. The resistive, sintered aluminum nitride ceramic body of claim 38, wherein said dihedral angle is greater than 30°.

42. The resistive, sintered aluminum nitride ceramic body of claim 38, wherein said dihedral angle is greater than or equal to about 80°.

43. The resistive, sintered aluminum nitride ceramic body of claim 38, wherein the calcium containing component of said second phase is substantially dewetted.

44. A resistive, sintered aluminum nitride ceramic body comprising a cofired multilayer laminate containing at least one aluminum nitride ceramic layer adjacent to at least one dense metal layer, wherein said ceramic layer has a microstructure containing aluminum nitride grains and a second phase having at least one calcium containing component, said calcium containing component of said second phase being in contact with the aluminum nitride grains at a dihedral angle sufficient to provide a resistivity of at least about $10^8$ Ω-cm and comprising at least one composition defined by the region including and within lines D-E-F-H-B in FIG. 4.

45. The resistive, sintered aluminum nitride ceramic body of claim 44, wherein said dihedral angle is greater than 30°.

46. The resistive, sintered aluminum nitride ceramic body of claim 44, wherein said dihedral angle is greater than or equal to about 80°.

47. The resistive, sintered aluminum nitride ceramic body of claim 44, wherein the calcium containing component of said second phase is substantially dewetted.

48. The resistive, sintered aluminum nitride ceramic body of claim 44, wherein the calcium containing component of said second phase is at least one of $CaYAl_3O_7$ and $CaYAlO_4$ and wherein said second phase includes at least one yttrium aluminate.

49. The resistive, sintered aluminum nitride ceramic body of claim 48 wherein said yttrium aluminate is YAG, calcium substituted $YAlO_3$ or mixtures thereof.

50. The resistive, sintered aluminum nitride ceramic body of claim 48 wherein said yttrium aluminate is calcium substituted $YAlO_3$.

* * * * *